(12) United States Patent
Jerding et al.

(10) Patent No.: US 8,020,184 B2
(45) Date of Patent: Sep. 13, 2011

(54) CHANNEL CONTROL SYSTEM FOR EXITING FROM AN INTERACTIVE PROGRAM GUIDE

(76) Inventors: Dean F. Jerding, Roswell, GA (US);
Robert O. Banker, Cumming, GA (US);
Arturo A. Rodriguez, Norcross, GA (US)

( * ) Notice: Subject to any disclaimer, the term of this patent is extended or adjusted under 35 U.S.C. 154(b) by 1687 days.

(21) Appl. No.: 10/783,235

(22) Filed: Feb. 20, 2004

(65) Prior Publication Data
US 2004/0168191 A1    Aug. 26, 2004

Related U.S. Application Data

(62) Division of application No. 09/590,925, filed on Jun. 9, 2000, now Pat. No. 6,817,028.

(60) Provisional application No. 60/138,757, filed on Jun. 11, 1999.

(51) Int. Cl.
G06F 3/00 (2006.01)
G06F 13/00 (2006.01)
H04N 5/445 (2006.01)

(52) U.S. Cl. ............. 725/52; 725/37; 725/38; 725/39

(58) Field of Classification Search ............. 725/52
See application file for complete search history.

(56) References Cited

U.S. PATENT DOCUMENTS

| | | |
|---|---|---|
| 3,676,580 A | 7/1972 | Beck |
| 4,586,158 A | 4/1986 | Brandle |
| 4,706,121 A | 11/1987 | Young |
| 4,751,578 A | 6/1988 | Reiter et al. |
| 4,821,097 A | 4/1989 | Robbins |
| 4,827,250 A | 5/1989 | Stallkamp |
| 4,885,775 A | 12/1989 | Lucas |
| 4,908,713 A | 3/1990 | Levine |
| 4,930,158 A | 5/1990 | Vogel |
| 4,949,187 A | 8/1990 | Cohen |
| 4,963,994 A | 10/1990 | Levine |
| 4,984,152 A | 1/1991 | Muller |
| 4,991,011 A | 2/1991 | Johnson et al. |
| 5,038,211 A | 8/1991 | Hallenbeck |
| 5,172,413 A | 12/1992 | Bradley et al. |
| 5,191,410 A | 3/1993 | McCalley et al. |
| 5,253,066 A | 10/1993 | Vogel |
| 5,291,554 A | 3/1994 | Morales |
| 5,293,357 A | 3/1994 | Hallenbeck |
| 5,317,391 A | 5/1994 | Banker et al. |

(Continued)

FOREIGN PATENT DOCUMENTS

CA    2 363 052 A1    11/1995

(Continued)

OTHER PUBLICATIONS

"A Brief History of the Trailer," http://www.movietrailertrash.com/views/history.html, 11 pages (Publicly known at least as early as Dec. 20, 2003).

(Continued)

*Primary Examiner* — Joseph P Hirl
*Assistant Examiner* — Fred Peng

(57) ABSTRACT

An apparatus and method for browsing and viewing television programs while viewing a television program guide. In other words, a user is able to remain inside the program guide while viewing various television programs. In another aspect, a server system operator is provided an interface with flexible options for configuring user controls for viewing television programs while inside program guides in client devices.

8 Claims, 10 Drawing Sheets

---

REDUCED SCREEN CONTROL MENU

IPG FOCUS AND SELECTION EFFECTS ON REDUCED SCREEN:

☐ REDUCED SCREEN TUNING UNRELATED TO IN-FOCUS CHANNEL
☐ IN-FOCUS CHANNEL DETERMINES REDUCED SCREEN
☐ SELECTED IN-FOCUS CHANNEL DETERMINES REDUCED SCREEN

NON-NUMERIC CHANNEL SIGNALS:

☐ EXIT IPG AND TUNE TO REQUESTED CHANNEL
☐ TUNE REDUCED SCREEN TO REQUESTED CHANNEL
☐ CHANGE IN-FOCUS CHANNEL TO REQUESTED CHANNEL

NUMERIC CHANNEL SIGNALS:

☐ EXIT IPG AND TUNE TO REQUESTED CHANNEL
☐ TUNE REDUCED SCREEN TO REQUESTED CHANNEL
☐ CHANGE IN-FOCUS CHANNEL TO REQUESTED CHANNEL

U.S. PATENT DOCUMENTS

| | | | |
|---|---|---|---|
| 5,329,590 A | 7/1994 | Pond |
| 5,353,121 A | 10/1994 | Young et al. |
| 5,357,276 A | 10/1994 | Banker et al. |
| 5,359,362 A | 10/1994 | Lewis et al. |
| 5,371,551 A | 12/1994 | Logan et al. |
| 5,398,071 A | 3/1995 | Gove et al. |
| 5,410,326 A | 4/1995 | Goldstein |
| 5,410,343 A | 4/1995 | Coddington et al. |
| 5,410,344 A | 4/1995 | Graves et al. |
| 5,414,455 A | 5/1995 | Hooper et al. |
| 5,418,622 A | 5/1995 | Takeuchi |
| 5,448,313 A | 9/1995 | Kim et al. |
| 5,477,262 A | 12/1995 | Banker et al. |
| 5,479,268 A | 12/1995 | Young et al. |
| 5,481,542 A | 1/1996 | Logston et al. |
| 5,483,277 A | 1/1996 | Granger |
| 5,485,216 A | 1/1996 | Lee |
| 5,493,638 A | 2/1996 | Hooper et al. |
| 5,508,815 A | 4/1996 | Levine |
| 5,512,958 A | 4/1996 | Rzeszewski |
| 5,515,495 A | 5/1996 | Ikemoto |
| 5,521,631 A | 5/1996 | Budow et al. |
| 5,530,754 A | 6/1996 | Garfinkle |
| 5,532,735 A | 7/1996 | Blahut et al. |
| 5,532,754 A | 7/1996 | Young et al. |
| 5,544,354 A | 8/1996 | May et al. |
| 5,555,441 A | 9/1996 | Haddad |
| 5,557,541 A | 9/1996 | Schulhof et al. |
| 5,562,732 A | 10/1996 | Eisenberg |
| 5,568,272 A | 10/1996 | Levine |
| 5,583,560 A | 12/1996 | Florin et al. |
| 5,583,995 A | 12/1996 | Gardner et al. |
| 5,585,821 A | 12/1996 | Ishikura et al. |
| 5,585,838 A | 12/1996 | Lawler et al. |
| 5,589,892 A | 12/1996 | Knee et al. |
| 5,592,551 A | 1/1997 | Lett et al. |
| 5,594,509 A | 1/1997 | Florin et al. |
| 5,598,524 A | 1/1997 | Johnston, Jr. et al. |
| 5,600,364 A | 2/1997 | Hendricks et al. |
| 5,600,573 A | 2/1997 | Hendricks et al. |
| 5,614,940 A | 3/1997 | Cobbley et al. |
| 5,619,247 A | 4/1997 | Russo |
| 5,619,249 A | 4/1997 | Billock et al. |
| 5,621,456 A | 4/1997 | Florin et al. |
| 5,623,613 A | 4/1997 | Rowe et al. |
| 5,625,405 A | 4/1997 | DuLac et al. |
| 5,625,864 A | 4/1997 | Budow et al. |
| 5,629,732 A | 5/1997 | Moskowitz et al. |
| 5,631,693 A | 5/1997 | Wunderlich et al. |
| 5,632,681 A | 5/1997 | Bakoglu et al. |
| 5,635,979 A | 6/1997 | Kostreski et al. |
| 5,635,980 A | 6/1997 | Lin et al. |
| 5,635,989 A | 6/1997 | Rothmuller |
| 5,650,831 A | 7/1997 | Farwell |
| 5,659,350 A | 8/1997 | Hendricks et al. |
| 5,664,133 A | 9/1997 | Malamud |
| 5,666,293 A | 9/1997 | Metz et al. |
| 5,671,411 A | 9/1997 | Watts et al. |
| 5,675,752 A | 10/1997 | Scott et al. |
| 5,682,206 A | 10/1997 | Wehmeyer et al. |
| 5,682,597 A | 10/1997 | Ganek et al. |
| 5,684,918 A | 11/1997 | Abecassis |
| 5,686,954 A | 11/1997 | Yoshinobu et al. |
| 5,687,331 A | 11/1997 | Volk et al. |
| 5,689,641 A | 11/1997 | Ludwig et al. |
| 5,694,176 A | 12/1997 | Bruette et al. |
| 5,694,546 A | 12/1997 | Reisman |
| 5,699,107 A | 12/1997 | Lawler et al. |
| 5,715,169 A | 2/1998 | Noguchi |
| 5,715,515 A | 2/1998 | Akins, III et al. |
| 5,721,827 A | 2/1998 | Logan et al. |
| 5,721,829 A | 2/1998 | Dunn et al. |
| 5,721,897 A | 2/1998 | Rubinstein |
| 5,724,106 A | 3/1998 | Autry et al. |
| 5,724,521 A | 3/1998 | Dedrick |
| 5,724,646 A | 3/1998 | Ganek et al. |
| 5,727,060 A | 3/1998 | Young |
| 5,729,549 A | 3/1998 | Kostreski et al. |
| 5,732,216 A | 3/1998 | Logan et al. |
| 5,734,853 A | 3/1998 | Hendricks et al. |
| 5,737,028 A | 4/1998 | Bertram et al. |
| 5,740,304 A | 4/1998 | Katsuyama et al. |
| 5,740,549 A | 4/1998 | Reilly et al. |
| 5,745,837 A | 4/1998 | Fuhrmann |
| 5,748,493 A | 5/1998 | Lightfoot et al. |
| 5,751,282 A | 5/1998 | Girard et al. |
| 5,752,160 A | 5/1998 | Dunn |
| 5,754,773 A | 5/1998 | Ozden et al. |
| 5,764,873 A | 6/1998 | Magid et al. |
| 5,764,899 A | 6/1998 | Eggleston et al. |
| 5,771,435 A | 6/1998 | Brown |
| 5,774,170 A | 6/1998 | Hite et al. |
| 5,778,077 A | 7/1998 | Davidson |
| 5,790,170 A | 8/1998 | Suzuki |
| 5,790,176 A | 8/1998 | Craig |
| 5,790,935 A | 8/1998 | Payton |
| 5,790,940 A | 8/1998 | Laborde et al. |
| 5,796,828 A | 8/1998 | Tsukamoto et al. |
| 5,798,785 A | 8/1998 | Hendricks et al. |
| 5,799,063 A | 8/1998 | Krane |
| 5,801,747 A | 9/1998 | Bedard |
| 5,801,787 A | 9/1998 | Schein et al. |
| 5,802,502 A | 9/1998 | Gell et al. |
| 5,808,608 A | 9/1998 | Young et al. |
| 5,808,611 A | 9/1998 | Johnson et al. |
| 5,809,204 A | 9/1998 | Young et al. |
| 5,812,123 A | 9/1998 | Rowe et al. |
| 5,812,124 A | 9/1998 | Eick et al. |
| 5,812,786 A | 9/1998 | Seazholtz et al. |
| 5,822,123 A | 10/1998 | Davis et al. |
| 5,826,110 A | 10/1998 | Ozden et al. |
| 5,828,419 A | 10/1998 | Bruette et al. |
| 5,828,845 A | 10/1998 | Jagadish et al. |
| 5,835,843 A | 11/1998 | Haddad |
| 5,838,314 A | 11/1998 | Neel et al. |
| 5,844,620 A | 12/1998 | Coleman et al. |
| 5,848,352 A | 12/1998 | Dougherty et al. |
| 5,850,218 A | 12/1998 | LaJoie et al. |
| 5,856,975 A | 1/1999 | Rostoker et al. |
| 5,859,641 A | 1/1999 | Cave |
| 5,861,906 A | 1/1999 | Dunn et al. |
| 5,877,756 A | 3/1999 | Um |
| 5,880,768 A | 3/1999 | Lemmons et al. |
| 5,886,690 A | 3/1999 | Pond et al. |
| 5,886,732 A | 3/1999 | Humpleman |
| 5,895,454 A | 4/1999 | Harrington |
| 5,898,456 A | 4/1999 | Wahl |
| 5,900,905 A | 5/1999 | Shoff et al. |
| 5,905,522 A | 5/1999 | Lawler |
| 5,905,942 A | 5/1999 | Stoel et al. |
| 5,907,323 A | 5/1999 | Lawler et al. |
| 5,913,040 A | 6/1999 | Rakavy et al. |
| 5,914,712 A | 6/1999 | Sartain et al. |
| 5,914,746 A | 6/1999 | Matthews, III et al. |
| 5,915,068 A | 6/1999 | Levine |
| 5,917,822 A | 6/1999 | Lyles et al. |
| 5,929,849 A | 7/1999 | Kikinis |
| 5,930,493 A | 7/1999 | Ottesen et al. |
| 5,935,206 A | 8/1999 | Dixon et al. |
| 5,936,659 A | 8/1999 | Viswanathan et al. |
| 5,940,073 A | 8/1999 | Klosterman et al. |
| 5,943,047 A | 8/1999 | Suzuki |
| 5,956,024 A | 9/1999 | Strickland et al. |
| 5,956,716 A | 9/1999 | Kenner et al. |
| 5,960,411 A | 9/1999 | Hartman et al. |
| 5,961,603 A | 10/1999 | Kunkel et al. |
| 5,969,748 A | 10/1999 | Casement et al. |
| 5,978,043 A | 11/1999 | Blonstein et al. |
| 5,983,273 A | 11/1999 | White et al. |
| 5,986,650 A | 11/1999 | Ellis et al. |
| 5,987,256 A | 11/1999 | Wu et al. |
| 5,990,881 A | 11/1999 | Inoue et al. |
| 5,990,890 A | 11/1999 | Etheredge |
| 5,990,927 A | 11/1999 | Hendricks et al. |
| 5,995,134 A | 11/1999 | Hayashi |
| 6,002,401 A | 12/1999 | Baker |
| 6,005,565 A | 12/1999 | Legall et al. |

| | | | | | | |
|---|---|---|---|---|---|---|
| 6,005,631 A | 12/1999 | Anderson et al. | | 6,289,346 B1 | 9/2001 | Milewski et al. |
| 6,006,257 A | 12/1999 | Slezak | | 6,289,514 B1 | 9/2001 | Link et al. |
| 6,008,803 A | 12/1999 | Rowe et al. | | 6,292,624 B1 | 9/2001 | Saib et al. |
| 6,008,836 A | 12/1999 | Bruck et al. | | 6,305,019 B1 | 10/2001 | Dyer et al. |
| 6,014,184 A | 1/2000 | Knee et al. | | 6,311,011 B1 | 10/2001 | Kuroda |
| 6,014,694 A | 1/2000 | Aharoni et al. | | 6,314,572 B1 | 11/2001 | LaRocca et al. |
| 6,016,348 A | 1/2000 | Blatter et al. | | 6,314,573 B1 | 11/2001 | Gordon et al. |
| 6,018,359 A | 1/2000 | Kermode | | 6,314,575 B1 | 11/2001 | Billock et al. |
| 6,018,372 A | 1/2000 | Etheredge | | 6,317,777 B1 | 11/2001 | Skarbo et al. |
| 6,020,912 A | 2/2000 | De Lang | | 6,317,885 B1 | 11/2001 | Fries |
| 6,023,267 A | 2/2000 | Chapuis et al. | | 6,323,911 B1 | 11/2001 | Schein et al. |
| 6,025,837 A | 2/2000 | Matthews, III et al. | | 6,327,628 B1 | 12/2001 | Anuff et al. |
| 6,025,868 A | 2/2000 | Russo | | 6,335,936 B1 | 1/2002 | Bossemeyer, Jr. et al. |
| 6,025,869 A | 2/2000 | Stas et al. | | 6,347,400 B1 | 2/2002 | Ohkura et al. |
| 6,026,376 A | 2/2000 | Kenney | | 6,349,410 B1 | 2/2002 | Lortz |
| 6,035,281 A | 3/2000 | Crosskey et al. | | 6,353,448 B1 | 3/2002 | Scarborough et al. |
| 6,037,933 A | 3/2000 | Blonstein et al. | | 6,357,046 B1 | 3/2002 | Thompson et al. |
| 6,049,831 A | 4/2000 | Gardell et al. | | 6,359,636 B1 | 3/2002 | Schindler et al. |
| 6,057,872 A | 5/2000 | Candelore | | 6,360,367 B1 | 3/2002 | Yamamoto |
| 6,061,097 A | 5/2000 | Satterfield | | 6,362,841 B1 | 3/2002 | Nykanen |
| 6,064,380 A | 5/2000 | Swenson et al. | | 6,367,078 B1 | 4/2002 | Lasky |
| 6,064,980 A | 5/2000 | Jacobi et al. | | 6,378,130 B1 | 4/2002 | Adams |
| 6,070,186 A | 5/2000 | Nishio | | 6,381,332 B1 | 4/2002 | Glaab |
| 6,072,982 A | 6/2000 | Haddad | | 6,385,614 B1 | 5/2002 | Vellandi |
| 6,073,105 A | 6/2000 | Sutcliffe et al. | | 6,393,585 B1 | 5/2002 | Houha et al. |
| 6,075,575 A | 6/2000 | Schein et al. | | 6,396,549 B1 | 5/2002 | Weber |
| 6,081,263 A | 6/2000 | LeGall et al. | | 6,400,280 B1 | 6/2002 | Osakabe |
| 6,085,185 A | 7/2000 | Matsuzawa et al. | | 6,401,243 B1 | 6/2002 | Suzuki |
| 6,094,680 A | 7/2000 | Hokanson | | 6,405,239 B1 | 6/2002 | Addington et al. |
| 6,097,383 A | 8/2000 | Gaughan et al. | | 6,421,067 B1 | 7/2002 | Kamen et al. |
| 6,098,082 A | 8/2000 | Gibbon et al. | | 6,429,899 B1 | 8/2002 | Nio et al. |
| 6,101,512 A | 8/2000 | DeRose et al. | | 6,434,748 B1 | 8/2002 | Shen et al. |
| 6,108,002 A | 8/2000 | Ishizaki | | 6,441,862 B1 | 8/2002 | Yuen et al. |
| 6,108,042 A | 8/2000 | Adams et al. | | 6,442,332 B1 | 8/2002 | Knudson et al. |
| 6,118,445 A | 9/2000 | Nonomura et al. | | 6,442,755 B1 | 8/2002 | Lemmons et al. |
| 6,118,976 A | 9/2000 | Arias et al. | | 6,442,756 B1 | 8/2002 | Durden et al. |
| 6,124,878 A | 9/2000 | Adams et al. | | 6,446,261 B1 | 9/2002 | Rosser |
| 6,125,259 A | 9/2000 | Perlman | | 6,446,262 B1 | 9/2002 | Malaure et al. |
| 6,133,909 A | 10/2000 | Schein et al. | | 6,460,181 B1 | 10/2002 | Donnelly |
| 6,137,539 A | 10/2000 | Lownes et al. | | 6,463,585 B1 | 10/2002 | Hendricks et al. |
| 6,138,139 A | 10/2000 | Beck et al. | | 6,476,833 B1 | 11/2002 | Moshfeghi |
| 6,141,003 A | 10/2000 | Chor et al. | | 6,480,669 B1 | 11/2002 | Tsumagari et al. |
| 6,141,488 A | 10/2000 | Knudson et al. | | 6,481,010 B2 | 11/2002 | Nishikawa et al. |
| 6,145,083 A | 11/2000 | Shaffer et al. | | 6,481,011 B1 | 11/2002 | Lemmons |
| 6,148,332 A | 11/2000 | Brewer et al. | | 6,486,920 B2 | 11/2002 | Arai et al. |
| 6,151,059 A | 11/2000 | Schein et al. | | 6,501,902 B1 | 12/2002 | Wang |
| 6,157,377 A | 12/2000 | Shah-Nazaroff et al. | | 6,505,348 B1 | 1/2003 | Knowles et al. |
| 6,157,413 A | 12/2000 | Hanafee et al. | | 6,507,949 B1 | 1/2003 | Jonason et al. |
| 6,160,546 A | 12/2000 | Thompson et al. | | 6,510,556 B1 | 1/2003 | Kusaba et al. |
| 6,160,989 A | 12/2000 | Hendricks et al. | | 6,515,680 B1 | 2/2003 | Hendricks et al. |
| 6,163,272 A | 12/2000 | Goode et al. | | 6,515,710 B1 | 2/2003 | Koshimuta |
| 6,166,730 A | 12/2000 | Goode et al. | | 6,519,770 B2 | 2/2003 | Ford |
| 6,169,543 B1 | 1/2001 | Wehmeyer | | 6,526,575 B1 | 2/2003 | McCoy et al. |
| 6,172,674 B1 | 1/2001 | Etheredge | | 6,526,577 B1 | 2/2003 | Knudson et al. |
| 6,172,677 B1 | 1/2001 | Stautner et al. | | 6,532,589 B1 | 3/2003 | Proehl et al. |
| 6,177,931 B1 * | 1/2001 | Alexander et al. ............... 725/52 | | 6,536,041 B1 | 3/2003 | Knudson et al. |
| 6,181,333 B1 | 1/2001 | Chaney et al. | | 6,539,548 B1 | 3/2003 | Hendricks et al. |
| 6,181,693 B1 | 1/2001 | Maresca | | 6,543,053 B1 | 4/2003 | Li et al. |
| 6,182,287 B1 | 1/2001 | Schneidewend et al. | | 6,545,669 B1 | 4/2003 | Kinawi et al. |
| 6,184,877 B1 | 2/2001 | Dodson et al. | | 6,557,030 B1 | 4/2003 | Hoang |
| 6,188,684 B1 | 2/2001 | Setoyama et al. | | 6,563,515 B1 | 5/2003 | Reynolds et al. |
| 6,195,689 B1 | 2/2001 | Bahlmann | | 6,564,378 B1 | 5/2003 | Satterfield et al. |
| 6,201,540 B1 | 3/2001 | Gallup et al. | | 6,564,379 B1 | 5/2003 | Knudson et al. |
| 6,205,485 B1 | 3/2001 | Kikinis | | 6,564,383 B1 | 5/2003 | Combs et al. |
| 6,208,335 B1 | 3/2001 | Gordon et al. | | 6,571,390 B1 | 5/2003 | Dunn et al. |
| 6,209,130 B1 | 3/2001 | Rector et al. | | 6,574,793 B1 | 6/2003 | Ngo et al. |
| 6,216,264 B1 | 4/2001 | Maze et al. | | 6,578,077 B1 | 6/2003 | Rakoshitz et al. |
| 6,238,290 B1 | 5/2001 | Tarr et al. | | 6,594,699 B1 | 7/2003 | Sahai et al. |
| 6,239,845 B1 | 5/2001 | Itagaki et al. | | 6,594,825 B1 | 7/2003 | Goldschmidt Iki et al. |
| 6,240,555 B1 | 5/2001 | Shoff et al. | | 6,600,496 B1 | 7/2003 | Wagner et al. |
| 6,243,142 B1 | 6/2001 | Mugura et al. ................ 348/564 | | 6,604,240 B2 | 8/2003 | Ellis et al. |
| 6,249,532 B1 | 6/2001 | Yoshikawa et al. | | 6,609,253 B1 | 8/2003 | Swix et al. |
| 6,253,375 B1 | 6/2001 | Gordon et al. | | 6,611,958 B1 | 8/2003 | Shintani et al. |
| 6,259,733 B1 | 7/2001 | Kaye et al. | | 6,614,440 B1 | 9/2003 | Bowen et al. |
| 6,266,814 B1 | 7/2001 | Lemmons et al. | | 6,614,988 B1 | 9/2003 | Sampsell |
| 6,268,849 B1 | 7/2001 | Boyer et al. | | 6,628,302 B2 | 9/2003 | White et al. |
| 6,272,484 B1 | 8/2001 | Martin et al. | | 6,631,413 B1 | 10/2003 | Aggarwal et al. |
| 6,275,268 B1 | 8/2001 | Ellis et al. | | 6,642,939 B1 | 11/2003 | Vallone et al. |
| 6,282,713 B1 | 8/2001 | Kitsukawa et al. | | 6,647,548 B1 | 11/2003 | Lu et al. |

| | | |
|---|---|---|
| 6,651,044 B1 | 11/2003 | Stoneman |
| 6,662,365 B1 | 12/2003 | Sullivan et al. |
| 6,665,869 B1 | 12/2003 | Ellis et al. |
| 6,671,328 B1 | 12/2003 | Poon et al. |
| 6,675,384 B1 | 1/2004 | Block et al. |
| 6,675,385 B1 | 1/2004 | Wang |
| 6,678,891 B1 | 1/2004 | Wilcox et al. |
| 6,681,395 B1 | 1/2004 | Nishi |
| 6,681,396 B1 | 1/2004 | Bates et al. |
| 6,684,025 B1 | 1/2004 | Perlman |
| 6,684,400 B1 | 1/2004 | Goode et al. |
| 6,697,376 B1 | 2/2004 | Son et al. |
| 6,698,023 B2 | 2/2004 | Levitan |
| 6,701,523 B1 | 3/2004 | Hancock et al. |
| 6,701,528 B1 | 3/2004 | Arsenault et al. |
| 6,706,311 B2 | 3/2004 | Wong et al. |
| 6,708,336 B1 | 3/2004 | Bruette |
| 6,717,590 B1 | 4/2004 | Sullivan et al. |
| 6,718,552 B1 | 4/2004 | Goode |
| 6,725,461 B1 | 4/2004 | Dougherty et al. |
| 6,731,310 B2 | 5/2004 | Craycroft et al. |
| 6,732,367 B1 | 5/2004 | Ellis et al. |
| 6,732,369 B1 | 5/2004 | Leftwich et al. |
| 6,732,372 B2 | 5/2004 | Tomita et al. |
| 6,735,572 B2 | 5/2004 | Landesmann |
| 6,738,982 B1 | 5/2004 | Jerding |
| 6,757,909 B1 | 6/2004 | Maruo et al. |
| 6,760,918 B2 | 7/2004 | Rodriguez et al. |
| 6,769,127 B1 | 7/2004 | Bonomi et al. |
| 6,771,290 B1 | 8/2004 | Hoyle |
| 6,772,209 B1 | 8/2004 | Chernock et al. |
| 6,772,433 B1 | 8/2004 | LaJoie et al. |
| 6,782,550 B1 | 8/2004 | Cao |
| 6,791,620 B1 | 9/2004 | Elswick et al. |
| 6,792,615 B1 | 9/2004 | Rowe et al. |
| 6,801,533 B1 | 10/2004 | Barkley |
| 6,817,028 B1 | 11/2004 | Jerding et al. |
| 6,832,386 B1 | 12/2004 | Jerding et al. |
| 6,847,969 B1 | 1/2005 | Mathai et al. |
| 6,876,628 B2 | 4/2005 | Howard et al. |
| 6,898,762 B2 | 5/2005 | Ellis et al. |
| 6,901,385 B2 | 5/2005 | Okamoto et al. |
| 6,957,386 B2 | 10/2005 | Nishina et al. |
| 6,968,372 B1 | 11/2005 | Thompson et al. |
| 6,978,310 B1 | 12/2005 | Rodriguez et al. |
| 6,978,475 B1 | 12/2005 | Kunin et al. |
| 6,986,156 B1 | 1/2006 | Rodriguez et al. |
| 6,990,676 B1 | 1/2006 | Proehl et al. |
| 6,990,677 B1 | 1/2006 | Pietraszak et al. |
| 6,993,782 B1 | 1/2006 | Newberry et al. |
| 7,010,801 B1 | 3/2006 | Jerding et al. |
| 7,024,681 B1 | 4/2006 | Fransman et al. |
| 7,039,944 B1 | 5/2006 | Cho et al. |
| 7,062,466 B2 | 6/2006 | Wagner et al. |
| 7,076,734 B2 | 7/2006 | Wolff et al. |
| 7,086,077 B2 | 8/2006 | Giammaressi |
| 7,103,903 B1 | 9/2006 | Kydd |
| 7,110,714 B1 | 9/2006 | Kay et al. |
| 7,117,440 B2 | 10/2006 | Gordon et al. |
| 7,120,926 B1 | 10/2006 | Safadi et al. |
| 7,143,430 B1 | 11/2006 | Fingerman et al. |
| 7,150,031 B1 | 12/2006 | Rodriguez et al. |
| 7,155,733 B2 | 12/2006 | Rodriguez et al. |
| 7,180,422 B2 | 2/2007 | Milenkovic et al. |
| 7,185,355 B1 | 2/2007 | Ellis et al. |
| 7,188,356 B1 | 3/2007 | Miura et al. |
| 7,194,757 B1 | 3/2007 | Fish et al. |
| 7,200,857 B1 | 4/2007 | Rodriguez et al. |
| 7,237,251 B1 | 6/2007 | Oz et al. |
| 7,243,364 B2 | 7/2007 | Dunn et al. |
| 7,249,366 B1 | 7/2007 | Flavin |
| 7,324,552 B1 | 1/2008 | Galand et al. |
| 7,324,553 B1 | 1/2008 | Varier et al. |
| 7,334,251 B2 | 2/2008 | Rodriguez et al. |
| 7,340,759 B1 | 3/2008 | Rodriguez |
| 7,343,614 B1 | 3/2008 | Hendricks et al. |
| 7,356,477 B1 | 4/2008 | Allan et al. |
| 7,404,200 B1 | 7/2008 | Hailey et al. |
| 7,496,943 B1 | 2/2009 | Goldberg et al. |
| 7,496,945 B2 | 2/2009 | Rodriguez |
| 7,509,267 B1 | 3/2009 | Yarmolich et al. |
| 7,512,964 B2 | 3/2009 | Rodriguez et al. |
| 7,526,788 B2 | 4/2009 | Rodriguez |
| 7,647,549 B2 | 1/2010 | Denoual et al. |
| 7,673,314 B2 | 3/2010 | Ellis et al. |
| 7,685,520 B2 | 3/2010 | Rashkovskiy et al. |
| 7,707,614 B2 | 4/2010 | Krikorian et al. |
| 7,934,232 B1 | 4/2011 | Jerding et al. |
| 7,961,643 B2 | 6/2011 | Mcdonald et al. |
| 7,962,370 B2 | 6/2011 | Rodriguez et al. |
| 2001/0003846 A1 | 6/2001 | Rowe et al. |
| 2001/0013125 A1 | 8/2001 | Kitsukawa et al. |
| 2001/0013127 A1 | 8/2001 | Tomita et al. |
| 2001/0029523 A1 | 10/2001 | Mcternan et al. |
| 2001/0030667 A1 | 10/2001 | Kelts |
| 2001/0032335 A1 | 10/2001 | Jones |
| 2001/0034763 A1 | 10/2001 | Jacobs et al. |
| 2001/0036271 A1 | 11/2001 | Javed |
| 2001/0044744 A1 | 11/2001 | Rhoads |
| 2002/0002642 A1 | 1/2002 | Tyson et al. |
| 2002/0007485 A1 | 1/2002 | Rodriguez et al. |
| 2002/0013836 A1 | 1/2002 | Friedman et al. |
| 2002/0026496 A1 | 2/2002 | Boyer et al. |
| 2002/0026638 A1 | 2/2002 | Eldering et al. |
| 2002/0032638 A1 | 3/2002 | Arora et al. |
| 2002/0032728 A1 | 3/2002 | Sako et al. |
| 2002/0032905 A1 | 3/2002 | Sherr et al. |
| 2002/0042913 A1 | 4/2002 | Ellis et al. |
| 2002/0044762 A1 | 4/2002 | Wood et al. |
| 2002/0049804 A1 | 4/2002 | Rodriguez et al. |
| 2002/0049978 A1 | 4/2002 | Rodriguez et al. |
| 2002/0056098 A1 | 5/2002 | White |
| 2002/0056118 A1 | 5/2002 | Hunter et al. |
| 2002/0057336 A1 | 5/2002 | Gaul et al. |
| 2002/0062481 A1 | 5/2002 | Slaney et al. |
| 2002/0069105 A1 | 6/2002 | do Rosario Botelho |
| 2002/0069218 A1 | 6/2002 | Sull et al. |
| 2002/0069412 A1 | 6/2002 | Philips |
| 2002/0078176 A1 | 6/2002 | Nomura et al. |
| 2002/0083443 A1 | 6/2002 | Eldering et al. |
| 2002/0087981 A1 | 7/2002 | Daniels |
| 2002/0101367 A1 | 8/2002 | Geiger et al. |
| 2002/0104083 A1 | 8/2002 | Hendricks et al. |
| 2002/0108125 A1 | 8/2002 | Joao |
| 2002/0124249 A1 | 9/2002 | Shintani et al. |
| 2002/0128908 A1 | 9/2002 | Levin et al. |
| 2003/0002862 A1 | 1/2003 | Rodriguez et al. |
| 2003/0014753 A1 | 1/2003 | Beach et al. |
| 2003/0030679 A1 | 2/2003 | Jain |
| 2003/0031465 A1 | 2/2003 | Blake |
| 2003/0037068 A1 | 2/2003 | Thomas et al. |
| 2003/0037332 A1 | 2/2003 | Chapin et al. |
| 2003/0061619 A1 | 3/2003 | Giammaressi |
| 2003/0067554 A1 | 4/2003 | Klarfeld et al. |
| 2003/0074214 A1 | 4/2003 | Kelliher |
| 2003/0074257 A1 | 4/2003 | Saveliev et al. |
| 2003/0079227 A1 | 4/2003 | Knowles et al. |
| 2003/0088872 A1 | 5/2003 | Maissel et al. |
| 2003/0101451 A1 | 5/2003 | Bentolila et al. |
| 2003/0101454 A1 | 5/2003 | Ozer et al. |
| 2003/0124973 A1 | 7/2003 | Sie et al. |
| 2003/0126425 A1 | 7/2003 | Yang et al. |
| 2003/0131356 A1 | 7/2003 | Proehl et al. |
| 2003/0135853 A1 | 7/2003 | Goldman et al. |
| 2003/0154475 A1 | 8/2003 | Rodriguez et al. |
| 2003/0154486 A1 | 8/2003 | Dunn et al. |
| 2003/0159147 A1 | 8/2003 | Young et al. |
| 2003/0174243 A1 | 9/2003 | Arbeiter et al. |
| 2003/0188313 A1 | 10/2003 | Ellis et al. |
| 2003/0193486 A1 | 10/2003 | Estrop |
| 2003/0206553 A1 | 11/2003 | Surcouf et al. |
| 2003/0219228 A1 | 11/2003 | Thiagarajan et al. |
| 2003/0221194 A1 | 11/2003 | Thiagarajan et al. |
| 2004/0034867 A1 | 2/2004 | Rashkovskiy et al. |
| 2004/0049787 A1 | 3/2004 | Maissel et al. |
| 2004/0107436 A1 | 6/2004 | Ishizaki |
| 2004/0117831 A1 | 6/2004 | Ellis et al. |
| 2004/0128685 A1 | 7/2004 | Hassell et al. |

| | | |
|---|---|---|
| 2004/0133907 A1 | 7/2004 | Rodriguez et al. |
| 2004/0163117 A1 | 8/2004 | Rodriguez et al. |
| 2004/0181801 A1 | 9/2004 | Hagen et al. |
| 2004/0221310 A1 | 11/2004 | Herrington et al. |
| 2004/0261112 A1 | 12/2004 | Hicks et al. |
| 2004/0261125 A1 | 12/2004 | Ellis et al. |
| 2005/0008074 A1 | 1/2005 | van Beek et al. |
| 2005/0028190 A1 | 2/2005 | Rodriguez et al. |
| 2005/0044565 A1 | 2/2005 | Jerding et al. |
| 2005/0044566 A1 | 2/2005 | Jerding et al. |
| 2005/0044577 A1 | 2/2005 | Jerding et al. |
| 2005/0071882 A1 | 3/2005 | Rodriguez et al. |
| 2005/0076360 A1 | 4/2005 | Jerding et al. |
| 2005/0091693 A1 | 4/2005 | Amine et al. |
| 2005/0111046 A1 | 5/2005 | Kurumisawa et al. |
| 2005/0138657 A1 | 6/2005 | Leftwich |
| 2005/0155056 A1 | 7/2005 | Knee et al. |
| 2005/0160468 A1 | 7/2005 | Rodriguez et al. |
| 2005/0188415 A1 | 8/2005 | Riley |
| 2005/0204387 A1 | 9/2005 | Knudson et al. |
| 2005/0204388 A1 | 9/2005 | Knudson et al. |
| 2005/0213506 A1 | 9/2005 | Wakumoto et al. |
| 2005/0216936 A1 | 9/2005 | Knudson et al. |
| 2005/0240961 A1 | 10/2005 | Jerding et al. |
| 2005/0251822 A1 | 11/2005 | Knowles et al. |
| 2005/0278741 A1 | 12/2005 | Robarts et al. |
| 2005/0283797 A1 | 12/2005 | Eldering et al. |
| 2005/0283810 A1 | 12/2005 | Ellis et al. |
| 2005/0289618 A1 | 12/2005 | Hardin |
| 2006/0020982 A1 | 1/2006 | Jerding et al. |
| 2006/0026080 A1 | 2/2006 | Rodriguez et al. |
| 2006/0026665 A1 | 2/2006 | Rodriguez et al. |
| 2006/0059525 A1 | 3/2006 | Jerding et al. |
| 2006/0070107 A1 | 3/2006 | Renkis |
| 2006/0088105 A1 | 4/2006 | Shen et al. |
| 2006/0112434 A1 | 5/2006 | Banker et al. |
| 2006/0206913 A1 | 9/2006 | Jerding et al. |
| 2006/0271933 A1 | 11/2006 | Agassi et al. |
| 2006/0271964 A1 | 11/2006 | Rodriguez et al. |
| 2006/0271973 A1 | 11/2006 | Jerding et al. |
| 2007/0019670 A1 | 1/2007 | Falardeau |
| 2007/0053293 A1 | 3/2007 | McDonald et al. |
| 2007/0094690 A1 | 4/2007 | Rodriguez et al. |
| 2007/0136748 A1 | 6/2007 | Rodriguez et al. |
| 2007/0186240 A1 | 8/2007 | Ward, III et al. |
| 2008/0010658 A1 | 1/2008 | Abbott et al. |
| 2008/0098421 A1 | 4/2008 | Rodriguez et al. |
| 2008/0098422 A1 | 4/2008 | Rodriguez et al. |
| 2008/0101460 A1 | 5/2008 | Rodriguez |
| 2008/0104637 A1 | 5/2008 | Rodriguez et al. |
| 2008/0137755 A1 | 6/2008 | Onur et al. |
| 2008/0155631 A1 | 6/2008 | Liwerant et al. |
| 2008/0229361 A1 | 9/2008 | Jerding et al. |
| 2008/0279217 A1 | 11/2008 | McDonald et al. |
| 2008/0281968 A1 | 11/2008 | Rodriguez |
| 2008/0282307 A1 | 11/2008 | McDonald et al. |
| 2008/0282308 A1 | 11/2008 | McDonald et al. |
| 2009/0141794 A1 | 6/2009 | Rodriguez et al. |
| 2009/0150958 A1 | 6/2009 | Jerding et al. |
| 2009/0158306 A1 | 6/2009 | Rodriguez et al. |
| 2009/0158324 A1 | 6/2009 | Rodriguez et al. |
| 2009/0158329 A1 | 6/2009 | Rodriguez et al. |
| 2009/0158331 A1 | 6/2009 | Rodriguez et al. |
| 2009/0158332 A1 | 6/2009 | Rodriguez et al. |
| 2009/0158335 A1 | 6/2009 | Rodriguez et al. |
| 2009/0158339 A1 | 6/2009 | Rodriguez et al. |
| 2009/0158352 A1 | 6/2009 | Rodriguez et al. |
| 2009/0158354 A1 | 6/2009 | Rodriguez et al. |
| 2009/0158355 A1 | 6/2009 | Rodriguez et al. |
| 2009/0158363 A1 | 6/2009 | Rodriguez et al. |
| 2009/0183081 A1 | 7/2009 | Rodriguez et al. |
| 2009/0190028 A1 | 7/2009 | Rodriguez et al. |
| 2009/0193468 A1 | 7/2009 | Rodriguez |
| 2009/0193471 A1 | 7/2009 | Rodriguez |
| 2009/0276808 A1 | 11/2009 | Jerding et al. |
| 2009/0282372 A1 | 11/2009 | Jerding et al. |
| 2009/0282440 A1 | 11/2009 | Rodriguez |
| 2010/0242063 A1 | 9/2010 | Slaney et al. |

FOREIGN PATENT DOCUMENTS

| | | |
|---|---|---|
| CA | 2 223 025 C | 11/2001 |
| CA | 2 475 723 C | 1/2011 |
| EP | 0 572 090 A2 | 12/1993 |
| EP | 0 673 159 A1 | 9/1995 |
| EP | 0 680 214 A2 | 11/1995 |
| EP | 0 725 538 A2 | 8/1996 |
| EP | 0 763 936 A2 | 3/1997 |
| EP | 0 811 939 A2 | 12/1997 |
| EP | 0 838 915 A2 | 4/1998 |
| EP | 0 849 948 A2 | 6/1998 |
| EP | 0 854 645 A2 | 7/1998 |
| EP | 0 891 084 A2 | 1/1999 |
| EP | 0 896 318 A2 | 2/1999 |
| EP | 0 909 095 A1 | 4/1999 |
| EP | 0 701 756 B1 | 12/1999 |
| EP | 0 989 751 A2 | 3/2000 |
| EP | 1 069 801 A1 | 1/2001 |
| EP | 1 075 143 A1 | 2/2001 |
| EP | 1 111 572 A2 | 6/2001 |
| EP | 1 161 085 A1 | 12/2001 |
| GB | 2 343 051 A | 4/2000 |
| JP | 8-289219 | 11/1996 |
| JP | 9-322022 | 12/1997 |
| JP | 10-143734 | 5/1998 |
| JP | 11-73361 | 3/1999 |
| JP | 11-73394 | 3/1999 |
| JP | 11-164284 | 6/1999 |
| JP | 2000-101941 | 4/2000 |
| WO | WO 92/22983 | 12/1992 |
| WO | WO 94/14284 | 6/1994 |
| WO | WO 96/17467 | 6/1996 |
| WO | WO 96/33579 | 10/1996 |
| WO | WO 96/34486 | 10/1996 |
| WO | WO 96/34491 | 10/1996 |
| WO | WO 96/41477 | 12/1996 |
| WO | WO 96/41478 | 12/1996 |
| WO | WO 97/34414 | 9/1997 |
| WO | WO 98/03012 | 1/1998 |
| WO | WO 98/26528 | 6/1998 |
| WO | WO 98/31116 | 7/1998 |
| WO | WO 98/37695 | 8/1998 |
| WO | WO 98/39893 | 9/1998 |
| WO | WO 98/47279 | 10/1998 |
| WO | WO 98/48566 | 10/1998 |
| WO | WO 98/56172 | 12/1998 |
| WO | WO 98/56173 | 12/1998 |
| WO | WO 98/56188 | 12/1998 |
| WO | WO 99/01984 | 1/1999 |
| WO | WO 99/04560 | 1/1999 |
| WO | WO 99/04561 | 1/1999 |
| WO | WO 99/12109 | 3/1999 |
| WO | WO 99/14947 | 3/1999 |
| WO | WO 99/35831 | 7/1999 |
| WO | WO 99/45701 | 9/1999 |
| WO | WO 99/49717 | 10/1999 |
| WO | WO 99/52285 | 10/1999 |
| WO | WO 99/57903 | 11/1999 |
| WO | WO 99/60790 | 11/1999 |
| WO | WO 99/66719 | 12/1999 |
| WO | WO 00/02385 | 1/2000 |
| WO | WO 00/04726 | 1/2000 |
| WO | WO 00/05889 | 2/2000 |
| WO | WO 00/30354 | 5/2000 |
| WO | WO 00/40017 | 7/2000 |
| WO | WO 00/46988 | 8/2000 |
| WO | WO 00/49801 | 8/2000 |
| WO | WO 00/59202 | 10/2000 |
| WO | WO 00/60482 | 10/2000 |
| WO | WO 00/78031 A2 | 12/2000 |
| WO | WO 00/78045 A1 | 12/2000 |
| WO | WO 00/78047 A1 | 12/2000 |
| WO | WO 00/78048 A1 | 12/2000 |
| WO | WO 01/06788 A1 | 1/2001 |
| WO | WO 01/20907 A1 | 3/2001 |
| WO | WO 01/24067 A1 | 4/2001 |
| WO | WO 01/56273 A1 | 8/2001 |
| WO | WO 01/67736 A2 | 9/2001 |
| WO | WO 01/72042 A1 | 9/2001 |

| | | | |
|---|---|---|---|
| WO | WO 01/76245 A2 | 10/2001 |
| WO | WO 01/77888 A2 | 10/2001 |
| WO | WO 01/84831 A2 | 11/2001 |
| WO | WO 02/097584 A2 | 12/2002 |
| WO | WO 03/003164 A2 | 1/2003 |
| WO | WO 03/003709 A2 | 1/2003 |
| WO | WO 03/014873 A2 | 2/2003 |
| WO | WO 03/024084 A2 | 3/2003 |
| WO | WO 03/042787 A2 | 5/2003 |
| WO | WO 03/069898 A1 | 8/2003 |
| WO | WO 2004/091219 A1 | 10/2004 |
| WO | WO 2004/100500 A2 | 11/2004 |
| WO | WO 2005/059202 A1 | 6/2005 |
| WO | WO 2005/071658 A1 | 8/2005 |
| WO | WO 2007/030370 A1 | 3/2007 |

OTHER PUBLICATIONS

"Client User Interface Specification (Phase I) for Video-On-Demand Application Development on the Explorer 2000™ Digital Home Communications Terminal", Revision 1.10 (Aug. 31, 1998).
"Evidence of illustrative movie release years," Retrieved from the Internet Movie Database using Internet, http://www.imdb.com, 19 pages (Retrieved on Jun. 6, 2005).
"ISO/IEC 13818-6 Information technology—Generic coding of moving pictures and associated audio information—Part 6: Extensions for DSM-CC," Chapter 4, 113 pages (Sep. 1, 1998).
"Netcaster Developer's Guide," Devedge Online Documentation, Netscape Communications Corporation, http://developer.netscape.com/docs/manuals/netcast/devguide/ index.html, XP-002166370, 82 pages (Sep. 25, 1997).
"Netscape Navigator Help," Netscape Navigator Software User Documentation, Netscape Communications Corporation, http://home.netscape.com, XP-002166369, pp. 1-63 (Aug. 10, 1997).
"Sez You . . . origin of word daemon," *Take Our Word For It*, Issue 146, p. 4, http://www.takeourword.com/TOW146/page4.html (retrieved on Apr. 4, 2006).
Addington, Timothy H., "System Architecture Specification for Video-On-Demand Application Development on the Explorer 2000™ Digital Home Communications Terminal", Revision 1.10r Review Copy (Mar. 4, 1999).
Alberico, G. et al., "Satellite Interactive Multimedia: A New Opportunity for Broadcasters," *International Broadcasting Convention*, Conference Publication No. 447, pp. 18-23 (Sep. 12-16, 1997).
ATI Multimedia Center 7.9, User's Guide, ATI Technologies Inc., pp. i-vi and 1-96 (Copyright 2002).
Barth et al., "10 Fernsehen am PC", Suse GMBH, XP-002324319, pp. 143-149 (2001).
BPAI Decision for U.S. Appl. No. 09/692,995, mailed Aug. 20, 2008.
BPAI Decision for U.S. Appl. No. 09/693,288, mailed Nov. 28, 2007.
Canadian Office Action cited in Application No. 2,376,556 mailed Sep. 30, 2008.
Canadian Office Action cited in Application No. 2,376,556 mailed Nov. 23, 2007.
Canadian Office Action cited in Application No. 2,376,556 mailed Dec. 6, 2005.
Canadian Office Action cited in Application No. 2,402,088 mailed Jun. 1, 2010.
Canadian Office Action cited in Application No. 2,402,088 mailed May 30, 2006.
Canadian Office Action cited in Application No. 2,405,491 mailed Jun. 9, 2010.
Canadian Office Action cited in Application No. 2,405,491 mailed Apr. 3, 2009.
Canadian Office Action cited in Application No. 2,405,491 mailed May 22, 2008.
Canadian Office Action cited in Application No. 2,405,491 mailed Jun. 20, 2007.
Canadian Office Action cited in Application No. 2,405,491 mailed Jan. 20, 2006.
Canadian Office Action cited in Application No. 2,408,289 mailed Aug. 27, 2008.
Canadian Office Action cited in Application No. 2,408,289 mailed May 30, 2006.
Canadian Office Action cited in Application No. 2,451,477 mailed Nov. 3, 2009.
Canadian Office Action cited in Application No. 2,456,318 mailed May 5, 2008.
Canadian Office Action cited in Application No. 2,456,318 mailed Mar. 27, 2007.
Canadian Office Action cited in Application No. 2,459,334 mailed Apr. 16, 2009.
Canadian Office Action cited in Application No. 2,466,667 mailed Apr. 15, 2009.
Canadian Office Action cited in Application No. 2,475,723 mailed Jul. 7, 2009.
Canadian Office Action cited in Application No. 2,554,208 mailed Apr. 1, 2010.
Canadian Office Action cited in Application No. 2,621,605 mailed Dec. 15, 2009.
Cunningham et al., "5 Das X Window System"., Suse GMBH, XP-002324320, pp. 129-180 (2001).
Decision on Appeal affirmed cited in U.S. Appl. No. 09/590,434 mailed May 28, 2008.
Definition of "flag", *Microsoft Press: Computer User's Dictionary*, 3 pages (1998).
Definition of "renting", Webster's II: New College Dictionary, 1995, Houghton Mifflin Company, p. 939.
European Examination Report cited in Application No. 00 938 251.6 mailed Mar. 2, 2010.
European Examination Report cited in Application No. 00 938 251.6 mailed Nov. 2, 2007.
European Examination Report cited in Application No. 00 939 759.7 mailed May 10, 2007.
European Examination Report cited in Application No. 01 905 058.2 mailed Dec. 19, 2006.
European Examination Report cited in Application No. 01 922 261.1 mailed Jul. 18, 2008.
European Examination Report cited in Application No. 01 922 261.1 mailed Nov. 2, 2007.
European Examination Report cited in Application No. 01 922 261.1 mailed Jan. 24, 2007.
European Examination Report cited in Application No. 01 922 261.1 mailed May 26, 2006.
European Examination Report cited in Application No. 01 923 092.9 mailed Jul. 20, 2009.
European Examination Report cited in Application No. 01 923 092.9 mailed Nov. 27, 2008.
European Examination Report cited in Application No. 01 937 209.3 mailed Mar. 16, 2010.
European Examination Report cited in Application No. 01 937 209.3 mailed Jun. 23, 2008.
European Examination Report cited in Application No. 02 737 593.0 mailed May 6, 2009.
European Examination Report cited in Application No. 02 750 416.6 mailed Aug. 4, 2008.
European Examination Report cited in Application No. 02 750 416.6 mailed Aug. 28, 2007.
European Examination Report cited in Application No. 02 761 572.3 mailed Apr. 20, 2009.
European Examination Report cited in Application No. 02 761 572.3 mailed Sep. 22, 2008.
European Examination Report cited in Application No. 02 761 572.3 mailed Jan. 22, 2008.
European Examination Report cited in Application No. 02 761 572.3 mailed Aug. 29, 2007.
European Examination Report cited in Application No. 06 802 683.0 mailed Jun. 26, 2008.
Examiner's Answer to Appeal Brief cited in U.S. Appl. No. 09/590,488 mailed Jan. 11, 2008.
Japanese Office Action cited in Application No. 2001-581527 mailed Feb. 10, 2010.
Japanese Office Action cited in Application No. 2001-581527 mailed Sep. 8, 2009.
Kevin, "Change Screen Resolution in Windows (Tips, Tricks, Tweaks, and Setting)," http://www.tacktech.com/display.cfm?t-tid=207, pp. 1-3 (Oct. 26, 2002).

Leftwitch et al., "StarSight Interactive Television Program Guide—Functional/Interational Architecture Specification Document, Interaction Analysis and Design Project—Phase III," 36 pages.
Little et al., "Prospects for Interactive Video-On-Demand", IEEE Multimedia, IEEE Service Center, New York, NY US, vol. 1 No. 3, Sep. 1994, pp. 14-24, XP000476885 ISSN: 1070-986X.
McFedries, "The Complete Idiot's Guide to Windows 95," Que, 2nd Edition, p. 49 (1997).
PCT Search Report cited in International Application No. PCT/US00/15952 mailed Jan. 16, 2001.
PCT Search Report cited in International Application No. PCT/US00/15963 mailed Sep. 1, 2000.
PCT Search Report cited in International Application No. PCT/US00/16000 mailed Oct. 2, 2000.
PCT Search Report cited in International Application No. PCT/US01/02490 mailed May 18, 2001.
PCT Search Report cited in International Application No. PCT/US01/06663 mailed Oct. 18, 2001.
PCT Search Report cited in International Application No. PCT/US01/10874 mailed Nov. 29, 2001.
PCT Search Report cited in International Application No. PCT/US01/14150 mailed Apr. 29, 2002.
PCT Search Report cited in International Application No. PCT/US02/20307 mailed Jan. 3, 2003.
PCT Search Report cited in International Application No. PCT/US02/20519 mailed Apr. 7, 2003.
PCT Search Report cited in International Application No. PCT/US02/24704 mailed Mar. 5, 2003.
PCT Search Report cited in International Application No. PCT/US02/28212 mailed Jan. 23, 2003.
PCT Search Report cited in International Application No. PCT/US02/36291 mailed May 23, 2003.
PCT Search Report cited in International Application No. PCT/US03/03391 mailed Jul. 14, 2003.
PCT Search Report and Written Opinion cited in International Application No. PCT/US2005/001812 mailed May 2, 2005.
PCT Search Report and Written Opinion cited in International Application No. PCT/US2006/033965 mailed Feb. 9, 2007.
PCT Search Report and Written Opinion cited in International Application No. PCT/US2006/033965 Feb. 19, 2007.
PCT Written Opinion cited in International Application No. PCT/US00/15952 mailed Jul. 25, 2001.
PCT Written Opinion cited in International Application No. PCT/US00/15963 mailed Jun. 22, 2001.
PCT Written Opinion cited in International Application No. PCT/US00/16000 mailed Oct. 25, 2001.
PCT Written Opinion cited in International Application No. PCT/US01/02490 mailed Oct. 23, 2001.
PCT Written Opinion cited in International Application No. PCT/US01/06663 mailed Jan. 3, 2002.
PCT Written Opinion cited in International Application No. PCT/US01/10874 mailed Jun. 4, 2002.
PCT Written Opinion cited in International Application No. PCT/US01/14150 mailed Sep. 30, 2004.
PCT Written Opinion cited in International Application No. PCT/US02/20307 mailed Aug. 8, 2003.
PCT Written Opinion cited in International Application No. PCT/US02/20519 mailed Apr. 6, 2004.
PCT Written Opinion cited in International Application No. PCT/US02/24704 mailed Nov. 20, 2003.
PCT Written Opinion cited in International Application No. PCT/US02/28212 mailed Dec. 4, 2003.
Petit et al., "Bandwidth Resource Optimization in Video-On-Demand Network Architectures", Community Networking Integrated Multimedia Services to the Home, 1994, Proceedings of the 1st International Workshop on San Francisco, CA USA, Jul. 1994, New York, NY USA, IEEE, Jul. 1994, pp. 91-97, XP010124402 ISBN: 978-0-7803-2076-5.
Reid, Dixie, "Coming attractions before they hit the big screen, most films begin life as a trailer," *The Sacramento Bee*, Sacramento, California, p. E.1 (Jul. 18, 1996).
Remote Wonder, ATI, Tweak 3D, pp. 1-5 (Sep. 30, 2002).
Reply Brief in U.S. Appl. No. 09/565,931 mailed on Sep. 17, 2007.
Rottentomatoes web archived site, http://web.archive.org/web/20000301122211/http://rottentomatoes.com, Mar. 1, 2000, pp. 1-2.
Summons to attend oral proceedings pursuant to Rule 115(1) EPC in European Application No. 02737593.0-1241 mailed May 28, 2010.
Supplementary European Search Report cited in European Application No. 02737593.0 mailed Mar. 3, 2009.
Supplementary European Search Report cited in European Application No. 02744705.1 mailed Feb. 19, 2010.
Supplementary European Search Report cited in European Application No. 02750416.6 mailed Jan. 2, 2007.
Supplementary European Search Report cited in European Application No. 02761572.3 mailed Mar. 20, 2007.
Supplementary European Search Report cited in European Application No. 02797096.1 mailed Oct. 14, 2005.
Supplementary European Search Report cited in European Application No. 03713364.2 mailed Jul. 6, 2005.
U.S. Final Office Action cited in U.S. Appl. No. 09/518,041 mailed Jul. 7, 2008.
U.S. Non-Final Office Action cited in U.S. Appl. No. 09/518,041 mailed Jan. 10, 2008.
U.S. Final Office Action cited in U.S. Appl. No. 09/518,041 mailed Aug. 24, 2007.
U.S. Non-Final Office Action cited in U.S. Appl. No. 09/518,041 mailed Feb. 6, 2007.
U.S. Final Office Action cited in U.S. Appl. No. 09/518,041 mailed Aug. 28, 2006.
U.S. Non-Final Office Action cited in U.S. Appl. No. 09/518,041 mailed Apr. 4, 2006.
U.S. Final Office Action cited in U.S. Appl. No. 09/518,041 mailed Sep. 15, 2005.
U.S. Non-Final Office Action cited in U.S. Appl. No. 09/518,041 mailed Apr. 22, 2005.
U.S. Final Office Action cited in U.S. Appl. No. 09/518,041 mailed Oct. 20, 2004.
U.S. Non-Final Office Action cited in U.S. Appl. No. 09/518,041 mailed Feb. 11, 2004.
U.S. Final Office Action cited in U.S. Appl. No. 09/518,041 mailed Aug. 27, 2003.
U.S. Non-Final Office Action cited in U.S. Appl. No. 09/518,041 mailed Mar. 18, 2003.
U.S. Final Office Action cited in U.S. Appl. No. 09/542,484 mailed Jun. 17, 2008.
U.S. Non-Final Office Action cited in U.S. Appl. No. 09/542,484 mailed Dec. 7, 2007.
U.S. Non-Final Office Action cited in U.S. Appl. No. 09/542,484 mailed Mar. 12, 2007.
U.S. Non-Final Office Action cited in U.S. Appl. No. 09/542,484 mailed Sep. 7, 2006.
U.S. Final Office Action cited in U.S. Appl. No. 09/542,484 mailed Mar. 21, 2006.
U.S. Non-Final Office Action cited in U.S. Appl. No. 09/542,484 mailed Jul. 28, 2005.
U.S. Final Office Action cited in U.S. Appl. No. 09/542,484 mailed Mar. 22, 2005.
U.S. Non-Final Office Action cited in U.S. Appl. No. 09/542,484 mailed Apr. 1, 2004.
U.S. Non-Final Office Action cited in U.S. Appl. No. 09/565,931 mailed Oct. 28, 2009.
U.S. Final Office Action cited in U.S. Appl. No. 09/565,931 mailed Jul. 14, 2009.
U.S. Non-Final Office Action cited in U.S. Appl. No. 09/565,931 mailed Feb. 13, 2009.
U.S. Final Office Action cited in U.S. Appl. No. 09/565,931 mailed Jun. 15, 2006.
U.S. Non-Final Office Action cited in U.S. Appl. No. 09/565,931 mailed Jan. 11, 2006.
U.S. Final Office Action cited in U.S. Appl. No. 09/565,931 mailed Jul. 1, 2005.
U.S. Non-Final Office Action cited in U.S. Appl. No. 09/565,931 mailed Sep. 10, 2004.
U.S. Final Office Action cited in U.S. Appl. No. 09/590,434 mailed May 11, 2006.

U.S. Non-Final Office Action cited in U.S. Appl. No. 09/590,434 mailed Nov. 21, 2005.
U.S. Final Office Action cited in U.S. Appl. No. 09/590,434 mailed Dec. 1, 2004.
U.S. Non-Final Office Action cited in U.S. Appl. No. 09/590,434 mailed Apr. 22, 2004.
U.S. Final Office Action cited in U.S. Appl. No. 09/590,434 mailed Dec. 18, 2003.
U.S. Non-Final Office Action cited in U.S. Appl. No. 09/590,434 mailed May 23, 2003.
U.S. Final Office Action cited in U.S. Appl. No. 09/590,488 mailed Feb. 27, 2007.
U.S. Non-Final Office Action cited in U.S. Appl. No. 09/590,488 mailed Oct. 26, 2006.
U.S. Final Office Action cited in U.S. Appl. No. 09/590,488 mailed Jul. 10, 2006.
U.S. Non-Final Office Action cited in U.S. Appl. No. 09/590,488 mailed Dec. 20, 2005.
U.S. Final Office Action cited in U.S. Appl. No. 09/590,488 mailed Jun. 30, 2005.
U.S. Non-Final Office Action cited in U.S. Appl. No. 09/590,488 mailed Nov. 16, 2004.
U.S. Final Office Action cited in U.S. Appl. No. 09/590,488 mailed Jun. 7, 2004.
U.S. Final Office Action cited in U.S. Appl. No. 09/590,488 mailed Dec. 16, 2003.
U.S. Non-Final Office Action cited in U.S. Appl. No. 09/590,488 mailed Jun. 10, 2003.
U.S. Final Office Action cited in U.S. Appl. No. 09/590,904 mailed Sep. 13, 2007.
U.S. Non-Final Office Action cited in U.S. Appl. No. 09/590,904 mailed Mar. 26, 2007.
U.S. Final Office Action cited in U.S. Appl. No. 09/590,904 mailed Nov. 15, 2006.
U.S. Non-Final Office Action cited in U.S. Appl. No. 09/590,904 mailed May 31, 2006.
U.S. Final Office Action cited in U.S. Appl. No. 09/590,904 mailed Jan. 24, 2006.
U.S. Non-Final Office Action cited in U.S. Appl. No. 09/590,904 mailed Jul. 13, 2005.
U.S. Final Office Action cited in U.S. Appl. No. 09/590,904 mailed Jan. 11, 2005.
U.S. Non-Final Office Action cited in U.S. Appl. No. 09/590,904 mailed Jun. 4, 2004.
U.S. Final Office Action cited in U.S. Appl. No. 09/591,356 mailed Apr. 13, 2006.
U.S. Non-Final Office Action cited in U.S. Appl. No. 09/591,356 mailed Dec. 20, 2005.
U.S. Final Office Action cited in U.S. Appl. No. 09/591,356 mailed Jun. 30, 2005.
U.S. Final Office Action cited in U.S. Appl. No. 09/591,356 mailed May 10, 2004.
U.S. Non-Final Office Action cited in U.S. Appl. No. 09/591,356 mailed Jan. 14, 2004.
U.S. Final Office Action cited in U.S. Appl. No. 09/591,356 mailed Sep. 26, 2003.
U.S. Non-Final Office Action cited in U.S. Appl. No. 09/591,356 mailed May 21, 2003.
U.S. Final Office Action cited in U.S. Appl. No. 09/692,920 mailed Jul. 22, 2008.
U.S. Non-Final Office Action cited in U.S. Appl. No. 09/692,920 mailed Jan. 17, 2008.
U.S. Final Office Action cited in U.S. Appl. No. 09/692,920 mailed Jun. 14, 2007.
U.S. Non-Final Office Action cited in U.S. Appl. No. 09/692,920 mailed Nov. 24, 2006.
U.S. Final Office Action cited in U.S. Appl. No. 09/692,920 mailed Jun. 21, 2006.
U.S. Non-Final Office Action cited in U.S. Appl. No. 09/692,920 mailed Feb. 16, 2006.
U.S. Final Office Action cited in U.S. Appl. No. 09/692,920 mailed Jun. 17, 2005.
U.S. Non-Final Office Action cited in U.S. Appl. No. 09/692,920 mailed Nov. 18, 2004.
U.S. Final Office Action cited in U.S. Appl. No. 09/692,995 mailed Sep. 4, 2009.
U.S. Non-Final Office Action cited in U.S. Appl. No. 09/692,995 mailed Jan. 23, 2009.
U.S. Final Office Action cited in U.S. Appl. No. 09/692,995 mailed Sep. 8, 2006.
U.S. Non-Final Office Action cited in U.S. Appl. No. 09/692,995 mailed Mar. 27, 2006.
U.S. Final Office Action cited in U.S. Appl. No. 09/692,995 mailed Sep. 21, 2005.
U.S. Final Office Action cited in U.S. Appl. No. 09/692,995 mailed May 3, 2005.
U.S. Non-Final Office Action cited in U.S. Appl. No. 09/692,995 mailed Oct. 21, 2004.
U.S. Final Office Action cited in U.S. Appl. No. 09/692,995 mailed Apr. 26, 2004.
U.S. Non-Final Office Action cited in U.S. Appl. No. 09/692,995 mailed Dec. 5, 2003.
U.S. Final Office Action cited in U.S. Appl. No. 09/693,115 mailed Jan. 25, 2005.
U.S. Non-Final Office Action cited in U.S. Appl. No. 09/693,115 mailed Jun. 16, 2004.
U.S. Final Office Action cited in U.S. Appl. No. 09/693,115 mailed Feb. 9, 2004.
U.S. Non-Final Office Action cited in U.S. Appl. No. 09/693,115 mailed Sep. 26, 2003.
U.S. Non-Final Office Action cited in U.S. Appl. No. 09/693,288 mailed Jun. 21, 2010.
U.S. Final Office Action cited in U.S. Appl. No. 09/693,288 mailed Dec. 1, 2005.
U.S. Non-Final Office Action cited in U.S. Appl. No. 09/693,288 mailed Jul. 19, 2005.
U.S. Final Office Action cited in U.S. Appl. No. 09/693,288 mailed Feb. 10, 2005.
U.S. Non-Final Office Action cited in U.S. Appl. No. 09/693,288 mailed Jul. 15, 2004.
U.S. Final Office Action cited in U.S. Appl. No. 09/693,288 mailed Feb. 26, 2004.
U.S. Non-Final Office Action cited in U.S. Appl. No. 09/693,288 mailed Oct. 27, 2003.
U.S. Final Office Action cited in U.S. Appl. No. 09/693,790 mailed Jul. 25, 2008.
U.S. Non-Final Office Action cited in U.S. Appl. No. 09/693,790 mailed Jan. 15, 2008.
U.S. Final Office Action cited in U.S. Appl. No. 09/693,790 mailed Jun. 19, 2007.
U.S. Non-Final Office Action cited in U.S. Appl. No. 09/693,790 mailed Dec. 28, 2006.
U.S. Final Office Action cited in U.S. Appl. No. 09/693,790 mailed Jun. 16, 2006.
U.S. Non-Final Office Action cited in U.S. Appl. No. 09/693,790 mailed Dec. 28, 2005.
U.S. Final Office Action cited in U.S. Appl. No. 09/693,790 mailed Jun. 21, 2005.
U.S. Non-Final Office Action cited in U.S. Appl. No. 09/693,790 mailed Oct. 6, 2004.
U.S. Final Office Action cited in U.S. Appl. No. 09/881,516 mailed Jun. 3, 2005.
U.S. Non-Final Office Action cited in U.S. Appl. No. 09/881,516 mailed Dec. 29, 2004.
U.S. Final Office Action cited in U.S. Appl. No. 09/881,516 mailed Jul. 26, 2004.
U.S. Final Office Action cited in U.S. Appl. No. 09/881,516 mailed Apr. 21, 2004.
U.S. Non-Final Office Action cited in U.S. Appl. No. 09/881,516 mailed Oct. 28, 2003.
U.S. Final Office Action cited in U.S. Appl. No. 09/894,508 mailed Sep. 17, 2009.
U.S. Non-Final Office Action cited in U.S. Appl. No. 09/894,508 mailed Feb. 4, 2009.

U.S. Non-Final Office Action cited in U.S. Appl. No. 09/894,508 mailed Jun. 13, 2008.
U.S. Final Office Action cited in U.S. Appl. No. 09/894,508 mailed Dec. 31, 2007.
U.S. Non-Final Office Action cited in U.S. Appl. No. 09/894,508 mailed Jul. 26, 2007.
U.S. Final Office Action cited in U.S. Appl. No. 09/896,231 mailed May 28, 2010.
U.S. Non-Final Office Action cited in U.S. Appl. No. 09/896,231 mailed Nov. 17, 2009.
U.S. Final Office Action cited in U.S. Appl. No. 09/896,231 mailed Jun. 3, 2009.
U.S. Non-Final Office Action cited in U.S. Appl. No. 09/896,231 mailed Dec. 23, 2008.
U.S. Final Office Action cited in U.S. Appl. No. 09/896,231 mailed Dec. 29, 2005.
U.S. Non-Final Office Action cited in U.S. Appl. No. 09/896,231 mailed Jun. 23, 2005.
U.S. Final Office Action cited in U.S. Appl. No. 09/924,111 mailed Aug. 7, 2008.
U.S. Non-Final Office Action cited in U.S. Appl. No. 09/924,111 mailed Jan. 29, 2008.
U.S. Final Office Action cited in U.S. Appl. No. 09/924,111 mailed Oct. 5, 2007.
U.S. Non-Final Office Action cited in U.S. Appl. No. 09/924,111 mailed Apr. 19, 2007.
U.S. Final Office Action cited in U.S. Appl. No. 09/924,111 mailed Sep. 18, 2006.
U.S. Non-Final Office Action cited in U.S. Appl. No. 09/924,111 mailed Mar. 15, 2006.
U.S. Final Office Action cited in U.S. Appl. No. 09/947,890 mailed Nov. 24, 2009.
U.S. Non-Final Office Action cited in U.S. Appl. No. 09/947,890 mailed Apr. 10, 2009.
U.S. Final Office Action cited in U.S. Appl. No. 09/947,890 mailed Nov. 6, 2008.
U.S. Non-Final Office Action cited in U.S. Appl. No. 09/947,890 mailed Jun. 25, 2008.
U.S. Final Office Action cited in U.S. Appl. No. 10/740,138 mailed Jan. 15, 2010.
U.S. Non-Final Office Action cited in U.S. Appl. No. 10/740,138 mailed Sep. 3, 2009.
U.S. Final Office Action cited in U.S. Appl. No. 10/740,138 mailed Mar. 19, 2009.
U.S. Non-Final Office Action cited in U.S. Appl. No. 10/740,138 mailed Sep. 15, 2008.
U.S. Final Office Action cited in U.S. Appl. No. 10/740,138 mailed Jun. 11, 2008.
U.S. Non-Final Office Action cited in U.S. Appl. No. 10/740,138 mailed Oct. 2, 2007.
U.S. Non-final Office Action cited in U.S. Appl. No. 10/761,777 mailed Jan. 21, 2010.
U.S. Non-Final Office Action cited in U.S. Appl. No. 10/761,777 mailed Jun. 11, 2009.
U.S. Final Office Action cited in U.S. Appl. No. 10/761,777 mailed Dec. 19, 2008.
U.S. Non-Final Office Action cited in U.S. Appl. No. 10/761,777 mailed Jul. 18, 2007.
U.S. Non-Final Office Action cited in U.S. Appl. No. 10/761,777 mailed Jan. 24, 2007.
U.S. Final Office Action cited in U.S. Appl. No. 10/778,494 mailed Jul. 25, 2008.
U.S. Non-Final Office Action cited in U.S. Appl. No. 10/778,494 mailed Jan. 16, 2008.
U.S. Final Office Action cited in U.S. Appl. No. 10/778,494 mailed May 22, 2007.
U.S. Non-Final Office Action cited in U.S. Appl. No. 10/778,494 mailed Feb. 2, 2007.
U.S. Final Office Action cited in U.S. Appl. No. 10/778,494 mailed Aug. 28, 2006.
U.S. Non-Final Office Action cited in U.S. Appl. No. 10/778,494 mailed Dec. 29, 2004.
U.S. Non-Final Office Action cited in U.S. Appl. No. 10/934,253 mailed Apr. 27, 2010.
U.S. Final Office Action cited in U.S. Appl. No. 10/934,253 mailed Dec. 23, 2009.
U.S. Non-Final Office Action cited in U.S. Appl. No. 10/934,253 mailed Jun. 26, 2009.
U.S. Final Office Action cited in U.S. Appl. No. 10/934,253 mailed Dec. 26, 2008.
U.S. Non-Final Office Action cited in U.S. Appl. No. 10/934,253 mailed Jun. 17, 2008.
U.S. Final Office Action cited in U.S. Appl. No. 10/934,253 mailed Jul. 24, 2007.
U.S. Non-Final Office Action cited in U.S. Appl. No. 10/934,253 mailed Feb. 9, 2007.
U.S. Non-Final Office Action cited in U.S. Appl. No. 10/934,253 mailed Sep. 14, 2006.
U.S. Final Office Action cited in U.S. Appl. No. 10/957,849 mailed Aug. 8, 2008.
U.S. Non-Final Office Action cited in U.S. Appl. No. 10/957,849 mailed Apr. 30, 2008.
U.S. Final Office Action cited in U.S. Appl. No. 10/957,854 mailed Apr. 1, 2010.
U.S. Non-Final Office Action cited in U.S. Appl. No. 10/957,854 mailed Sep. 28, 2009.
U.S. Final Office Action cited in U.S. Appl. No. 10/957,854 mailed Apr. 7, 2009.
U.S. Non-Final Office Action cited in U.S. Appl. No. 10/957,854 mailed Oct. 15, 2008.
U.S. Non-Final Office Action cited in U.S. Appl. No. 10/957,854 mailed Apr. 30, 2008.
U.S. Non-Final Office Action cited in U.S. Appl. No. 10/957,942 mailed Jun. 30, 2010.
U.S. Final Office Action cited in U.S. Appl. No. 10/957,942 mailed Jul. 28, 2009.
U.S. Non-Final Office Action cited in U.S. Appl. No. 10/957,942 mailed Jan. 14, 2009.
U.S. Final Office Action cited in U.S. Appl. No. 10/957,942 mailed Jul. 31, 2008.
U.S. Non-Final Office Action cited in U.S. Appl. No. 10/957,942 mailed May 1, 2008.
U.S. Final Office Action cited in U.S. Appl. No. 10/981,053 mailed Jan. 21, 2010.
U.S. Non-Final Office Action cited in U.S. Appl. No. 10/981,053 mailed Apr. 15, 2009.
U.S. Final Office Action cited in U.S. Appl. No. 10/981,053 mailed Aug. 6, 2008.
U.S. Non-Final Office Action cited in U.S. Appl. No. 10/891,053 mailed Jan. 2, 2008.
U.S. Final Office Action cited in U.S. Appl. No. 10/994,599 mailed Dec. 1, 2006.
U.S. Non-Final Office Action cited in U.S. Appl. No. 10/994,599 mailed May 16, 2006.
U.S. Final Office Action cited in U.S. Appl. No. 10/994,599 mailed Jan. 26, 2006.
U.S. Non-Final Office Action cited in U.S. Appl. No. 10/994,599 mailed Aug. 23, 2005.
U.S. Final Office Action cited in U.S. Appl. No. 11/162,345 mailed Mar. 16, 2010.
U.S. Non-Final Office Action cited in U.S. Appl. No. 11/162,345 mailed Aug. 21, 2009.
U.S. Final Office Action cited in U.S. Appl. No. 11/162,345 mailed Mar. 9, 2009.
U.S. Non-Final Office Action cited in U.S. Appl. No. 11/162,345 mailed Oct. 31, 2008.
U.S. Final Office Action cited in U.S. Appl. No. 11/170,348 mailed Feb. 1, 2010.
U.S. Non-Final Office Action cited in U.S. Appl. No. 11/170,348 mailed Sep. 30, 2009.
U.S. Final Office Action cited in U.S. Appl. No. 11/170,348 mailed May 28, 2009.
U.S. Non-Final Office Action cited in U.S. Appl. No. 11/170,348 mailed Dec. 11, 2008.

U.S. Final Office Action cited in U.S. Appl. No. 11/208,387 mailed Dec. 22, 2008.
U.S. Non-Final Office Action cited in U.S. Appl. No. 11/208,387 mailed Jun. 12, 2008.
U.S. Non-Final Office Action cited in U.S. Appl. No. 11/238,369 mailed Mar. 30, 2010.
U.S. Non-Final Office Action cited in U.S. Appl. No. 11/244,621 mailed Feb. 5, 2010.
U.S. Final Office Action cited in U.S. Appl. No. 11/244,621 mailed Sep. 17, 2009.
U.S. Non-Final Office Action cited in U.S. Appl. No. 11/244,621 mailed Mar. 19, 2009.
U.S. Non-Final Office Action cited in U.S. Appl. No. 11/244,621 mailed Sep. 19, 2008.
U.S. Non-Final Office Action cited in U.S. Appl. No. 11/275,245 mailed May 5, 2010.
U.S. Non-Final Office Action cited in U.S. Appl. No. 11/275,245 mailed Oct. 22, 2009.
U.S. Final Office Action cited in U.S. Appl. No. 11/275,245 mailed Jul. 29, 2009.
U.S. Non-Final Office Action cited in U.S. Appl. No. 11/275,245 mailed Sep. 22, 2008.
U.S. Final Office Action cited in U.S. Appl. No. 11/460,516 mailed Mar. 18, 2010.
U.S. Non-Final Office Action cited in U.S. Appl. No. 11/460,516 mailed Jun. 26, 2009.
U.S. Final Office Action cited in U.S. Appl. No. 11/460,516 mailed Feb. 13, 2009.
U.S. Non-Final Office Action cited in U.S. Appl. No. 11/460,516 mailed Sep. 17, 2008.
U.S. Non-Final Office Action cited in U.S. Appl. No. 11/496,303 mailed Mar. 2, 2010.
U.S. Non-Final Office Action cited in U.S. Appl. No. 11/496,303 mailed Sep. 29, 2009.
U.S. Final Office Action cited in U.S. Appl. No. 11/496,303 mailed Apr. 1, 2009.
U.S. Non-Final Office Action cited in U.S. Appl. No. 11/496,303 mailed Sep. 18, 2008.
U.S. Final Office Action cited in U.S. Appl. No. 11/564,431 mailed Jan. 4, 2010.
U.S. Non-Final Office Action cited in U.S. Appl. No. 11/564,431 mailed Aug. 24, 2009.
U.S. Final Office Action cited in U.S. Appl. No. 11/678,653 mailed Jun. 23, 2010.
U.S. Non-Final Office Action cited in U.S. Appl. No. 11/678,653 mailed Dec. 16, 2009.
U.S. Non-Final Office Action cited in U.S. Appl. No. 11/963,942 mailed Jun. 8, 2010.
U.S. Non-Final Office Action cited in U.S. Appl. No. 12/127,968 mailed Mar. 31, 2010.
U.S. Final Office Action cited in U.S. Appl. No. 12/127,968 mailed Dec. 1, 2009.
U.S. Non-Final Office Action cited in U.S. Appl. No. 12/127,968 mailed Apr. 30, 2009.
U.S. Non-Final Office Action cited in U.S. Appl. No. 12/179,752 mailed Dec. 23, 2009.
U.S. Non-Final Office Action cited in U.S. Appl. No. 12/179,767 mailed Jan. 22, 2010.
U.S. Non-Final Office Action cited in U.S. Appl. No. 12/180,416 mailed Jun. 25, 2010.
U.S. Final Office Action cited in U.S. Appl. No. 12/372,887 mailed Apr. 14, 2010.
U.S. Non-Final Office Action cited in U.S. Appl. No. 12/372,887 mailed Oct. 16, 2009.
U.S. Non-Final Office Action cited in U.S. Appl. No. 12/372,894 mailed Oct. 27, 2009.
U.S. Final Office Action cited in U.S. Appl. No. 12/372,917 mailed May 17, 2010.
U.S. Non-Final Office Action cited in U.S. Appl. No. 12/372,917 mailed Oct. 26, 2009.
U.S. Final Office Action cited in U.S. Appl. No. 12/388,139 mailed Jul. 6, 2010.
U.S. Non-Final Office Action cited in U.S. Appl. No. 12/388,139 mailed Dec. 15, 2009.
U.S. Non-Final Office Action cited in U.S. Appl. No. 12/389,128 mailed Jun. 2, 2010.
U.S. Final Office Action cited in U.S. Appl. No. 12/389,564 mailed Apr. 28, 2010.
U.S. Non-Final Office Action cited in U.S. Appl. No. 12/389,564 mailed Nov. 10, 2009.
U.S. Final Office Action cited in U.S. Appl. No. 12/413,686 mailed Jun. 10, 2010.
U.S. Non-Final Office Action cited in U.S. Appl. No. 12/413,686 mailed Nov. 30, 2009.
U.S. Appl. No. 09/330,792, filed Jun. 11, 1999 entitled "Series Reminders and Series Recording from an Interactive Television program Guide".
U.S. Appl. No. 09/378,533, filed Aug. 20, 1999 entitled "Electronic Program Guide with Advance Notification".
U.S. Appl. No. 09/518,041 filed Mar. 2, 2000 entitled "Apparatus and Method for Providing a Plurality of Interactive Program Guide Initial Arrangements".
U.S. Appl. No. 09/542,484, filed Apr. 3, 2000 entitled "System for Providing Alternative Services".
U.S. Appl. No. 09/565,931 filed May 4, 2000 entitled "Navigation Paradigm for Access to Television Services".
U.S. Appl. No. 09/590,434 filed Jun. 9, 2000 entitled "Video Promotional and Advertising Systems for Video on Demand System".
U.S. Appl. No. 09/590,488 filed Jun. 9, 2000 entitled "User Interface Navigational System with Parental Control for Video on Demand System".
U.S. Appl. No. 09/590,521 filed Jun. 9, 2000 entitled "Systems and Methods for Adaptive Scheduling and Dynamic Bandwidth Resource Allocation Management in a Digital Broadband Delivery System".
U.S. Appl. No. 09/590,904 filed Jun. 9, 2000 entitled "Program Information Searching System for Interactive Program Guide".
U.S. Appl. No. 09/591,356 filed Jun. 9, 2000 entitled "Future Program Options Menu System for Interactive Program Guide".
U.S. Appl. No. 09/692,920 filed Oct. 20, 2000 entitled "Media-on-Demand Title Indexing System".
U.S. Appl. No. 09/692,995 filed Oct. 20, 2000 entitled "Media-on-Demand Bookmark System".
U.S. Appl. No. 09/693,115 filed Oct. 20, 2000 entitled "Media Services Window Configuration System".
U.S. Appl. No. 09/693,288 filed Oct. 20, 2000 entitled "Media-on-Demand Rental Duration Management System".
U.S. Appl. No. 09/693,790 filed Oct. 20, 2000 entitled "Integrated Searching System for Interactive Media Guide".
U.S. Restriction Requirement cited in U.S. Appl. No. 11/162,345 mailed Jul. 3, 2008.
VESA Plug and Display Standard, Version 1, Video Electronics Standards Association, XP-002123075, 90 pages (Jun. 11, 1997).
W3C, Putting language attributes in HTML, www.w3.org.org/International/O-help-lang, 2 pages (Apr. 29, 1997).
U.S. Final Office Action cited in U.S. Appl. No. 10/761,777 mailed Aug. 2, 2010.
U.S. Final Office Action cited in U.S. Appl. No. 11/496,303 mailed Jul. 22, 2010.
U.S. Non-Final Office Action cited in U.S. Appl. No. 11/564,431 mailed Jul. 20, 2010.
U.S. Non-Final Office Action cited in U.S. Appl. No. 11/963,945 mailed Jul. 16, 2010.
U.S. Non-Final Office Action cited in U.S. Appl. No. 11/234,967 mailed Sep. 10, 2010.
U.S. Final Office Action cited in U.S. Appl. No. 11/238,369 mailed Aug. 31, 2010.
U.S. Final Office Action cited in U.S. Appl. No. 11/244,621 mailed Aug. 18, 2010.
U.S. Non-Final Office Action cited in U.S. Appl. No. 11/963,951 mailed Aug. 2, 2010.
U.S. Final Office Action cited in U.S. Appl. No. 12/127,968 mailed Sep. 14, 2010.
U.S. Final Office Action cited in U.S. Appl. No. 12/179,767 mailed Aug. 20, 2010.

U.S. Non-Final Office Action cited in U.S. Appl. No. 12/388,002 mailed Sep. 3, 2010.
U.S. Non-Final Office Action cited in U.S. Appl. No. 12/389,564 mailed Aug. 23, 2010.
Canadian Office Action cited in Application No. 2,408,289 mailed Sep. 2, 2010.
Canadian Office Action cited in Application No. 2,451,477 mailed Oct. 20, 2010.
U.S. Non-Final Office Action cited in U.S. Appl. No. 12/390,418 mailed Sep. 28, 2010.
U.S. Non-Final Office Action cited in U.S. Appl. No. 12/390,420 mailed Oct. 19, 2010.
U.S. Non-Final Office Action cited in U.S. Appl. No. 12/390,422 mailed Oct. 20, 2010.
U.S. Non-Final Office Action cited in U.S. Appl. No. 11/170,348 mailed Oct. 26, 2010.
Canadian Office Action cited in Application No. 2,456,318 mailed Nov. 17, 2010, 4 pages.
U.S. Non-Final Office Action cited in U.S. Appl. No. 10/740,138 mailed Oct. 27, 2010, 23 pages.
U.S. Non-Final Office Action cited in U.S. Appl. No. 10/934,253 mailed Nov. 4, 2010, 10 pages.
U.S. Final Office Action cited in U.S. Appl. No. 12/389,128 mailed Nov. 9, 2010, 50 pages.
U.S. Non-Final Office Action cited in U.S. Appl. No. 12/179,763 mailed Jan. 4, 2011, 18 pages.
Canadian Office Action cited in Application No. 2,459,334 mailed Mar. 4, 2011, 3 pages.
"Industry Leading Software Vendors Endorse BroadVision's Next Generation of Retail and Business-To-Business E-Commerce Application Solutions," PR Newswire, Jun. 14, 1999, 4 pages.
Summons to attend oral proceedings in EP Application No. 01937209.3 mailed Mar. 21, 2011, 7 pages.
U.S. Non-Final Office Action cited in U.S. Appl. No. 11/162,345 mailed Feb. 1, 2011, 33 pages.
U.S. Non-Final Office Action cited in U.S. Appl. No. 12/389,564 mailed Jan. 21, 2011, 13 pages.
U.S. Non-Final Office Action cited in U.S. Appl. No. 12/413,686 mailed Mar. 17, 2011, 20 pages.
U.S. Non-Final Office Action cited in U.S. Appl. No. 10/761,777 mailed Apr. 12, 2011, 20 pages.
Canadian Office Action dated May 31, 2011 cited in Application No. 2,621,605, 2 pages.
U.S. Non-Final Office Action cited in U.S. Appl. No. 10/934,253 mailed Apr. 29, 2011, 11 pages.
U.S. Final Office Action cited in U.S. Appl. No. 12/389,564 mailed May 19, 2011, 15 pages.
U.S. Non-Final Office Action cited in U.S. Appl. No. 10/740,138 mailed Jun. 8, 2011, 26 pages.
U.S. Final Office Action cited in U.S. Appl. No. 11/170,348 mailed Jun. 9, 2011, 14 pages.

* cited by examiner

REDUCED SCREEN CONTROL MENU

IPG FOCUS AND SELECTION EFFECTS ON REDUCED SCREEN:

☐ REDUCED SCREEN TUNING UNRELATED TO IN-FOCUS CHANNEL
☐ IN-FOCUS CHANNEL DETERMINES REDUCED SCREEN
☐ SELECTED IN-FOCUS CHANNEL DETERMINES REDUCED SCREEN

NON-NUMERIC CHANNEL SIGNALS:

☐ EXIT IPG AND TUNE TO REQUESTED CHANNEL
☐ TUNE REDUCED SCREEN TO REQUESTED CHANNEL
☐ CHANGE IN-FOCUS CHANNEL TO REQUESTED CHANNEL

NUMERIC CHANNEL SIGNALS:

☐ EXIT IPG AND TUNE TO REQUESTED CHANNEL
☐ TUNE REDUCED SCREEN TO REQUESTED CHANNEL
☐ CHANGE IN-FOCUS CHANNEL TO REQUESTED CHANNEL

FIG. 4

CHANNEL CONTROL SYSTEM FOR EXITING FROM AN INTERACTIVE PROGRAM GUIDE

CROSS-REFERENCE TO RELATED APPLICATION

This application is a divisional of U.S. patent application Ser. No. 09/590,925, filed Jun. 9, 2000, now U.S. Pat. No. 6,817,028 issued on Nov. 9, 2004, which claims the benefit of U.S. Provisional Application Ser. No. 60/138,757, filed Jun. 11, 1999, which is hereby incorporated by reference herein in its entirety.

FIELD OF THE INVENTION

This invention relates in general to television systems, and more particularly, to the field of interactive program guides.

BACKGROUND OF THE INVENTION

Historically, television services have been comprised of analog broadcast audio and video signals. Cable television systems now receive broadcasts and retransmit them with other programming to subscribers over land-line networks, typically comprising fiber optic cable and/or coaxial cable. With the recent advent of digital transmission technology, cable television systems are now capable of providing much more than the traditional analog broadcast video. In addition, two-way and advanced one-way communications between a subscriber and a cable system headend are now possible.

In implementing enhanced programming, the home communication terminal ("HCT"), otherwise known as the settop box, has become an important computing device for accessing video services and navigating a subscriber through a maze of services available. In addition to supporting traditional analog broadcast video and functionality, digital HCTs (or "DHCTs") now also support an increasing number of services which are not analog, but rather digital; are not basic broadcast, but rather two-way communication such as video-on-demand; and are not basic video, such as e-mail or web browsers. These are all in addition to the host of other television services which are increasingly being demanded by consumers, examples of which include audio and audio/visual programming, advance navigation controls, impulse pay-per-view technology, and on-line commerce. In addition to the interactive services, the increased bandwidth available through a digital television system has made it possible for a subscriber to have access to hundreds, or even thousands, of channels and/or services. Thus, in order to provide these more powerful and complex features, the simple conventional channel abstractions need to be extended beyond those which have traditionally been provided.

Each HCT and DHCT (collectively hereinafter "DHCT") are typically connected to a cable or satellite television network. The DHCTs generally include hardware and software necessary to provide the functionality of the digital television system at the client's site. Preferably, some of the software executed by a DHCT is downloaded and/or updated via the cable television network. Each DHCT typically includes a processor, a communication component and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

As more and more services and applications are provided, cable television systems are providing television program information to the DHCT so that the subscriber can view the program information on the DHCT display such as the television. This program information has traditionally been organized for presentation purposes into a program guide format that presents the program information by time and channel only. The program guide can, for instance, automatically scroll the available television channels to present the program information such as name and title, by time.

Many cable system operators include one or more dedicated channels that scroll through the channel list displaying the programs that not only are currently on, but also are scheduled to be on in the future. These types of passive displays do not rely on a terminal for presentation of the programming data and also lack the interactive functionality of permitting a subscriber to scroll to a desired channel for a desired time. For example, the subscriber typically must view the programming information as it scrolls on the display and wait for either the desired channel and/or the desired time to search for the program that may be available for viewing.

With the advent of program guide "browsers" for use in cable television systems, viewers (also referred to as "subscribers" or "users") can literally scan program information by time and channel while watching the tuned channel. In analog systems that offer a limited number of cable television channels, these browsers enable the viewer to easily scan available programs one-by-one in order of channel number. However, many digital systems can provide hundreds or even thousands of channels. In such systems, viewers may be only familiar with a small fraction of the television programs available for viewing. As a result, viewers may end up spending significant amounts of time browsing through on-screen program guides in order to determine which program they would enjoy watching the most. This may be inconvenient since either the viewer browsing the program guide or other viewers in the same room may be missing a desirable alternative program while the program guide is being browsed. In addition, program descriptions in on-screen program guides often do not provide a viewer with enough information to be able to determine whether he or she would enjoy watching a particular program.

SUMMARY OF THE INVENTION

Briefly described, one preferred embodiment of the present invention provides an apparatus and method for browsing and viewing different television programs while browsing a television program guide. In other words, a user is able to remain inside the program guide while viewing various television programs. In another aspect of a preferred embodiment of the present invention, a server system operator is provided an interface with flexible options for configuring user controls for viewing television programs while inside program guides in client devices.

Other objects, features, and advantages of the present invention will become apparent to one with skill in the art upon examination of the following drawings and detailed description.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts or screen areas throughout the several views.

FIG. 4 is a diagram of a control menu for a system operator at the headend to configure how the reduced screen area of an interactive program guide will be tuned by a client device in accordance with the present invention as depicted in FIG. 2.

DETAILED DESCRIPTION OF THE PREFERRED EMBODIMENTS

Figure 1:
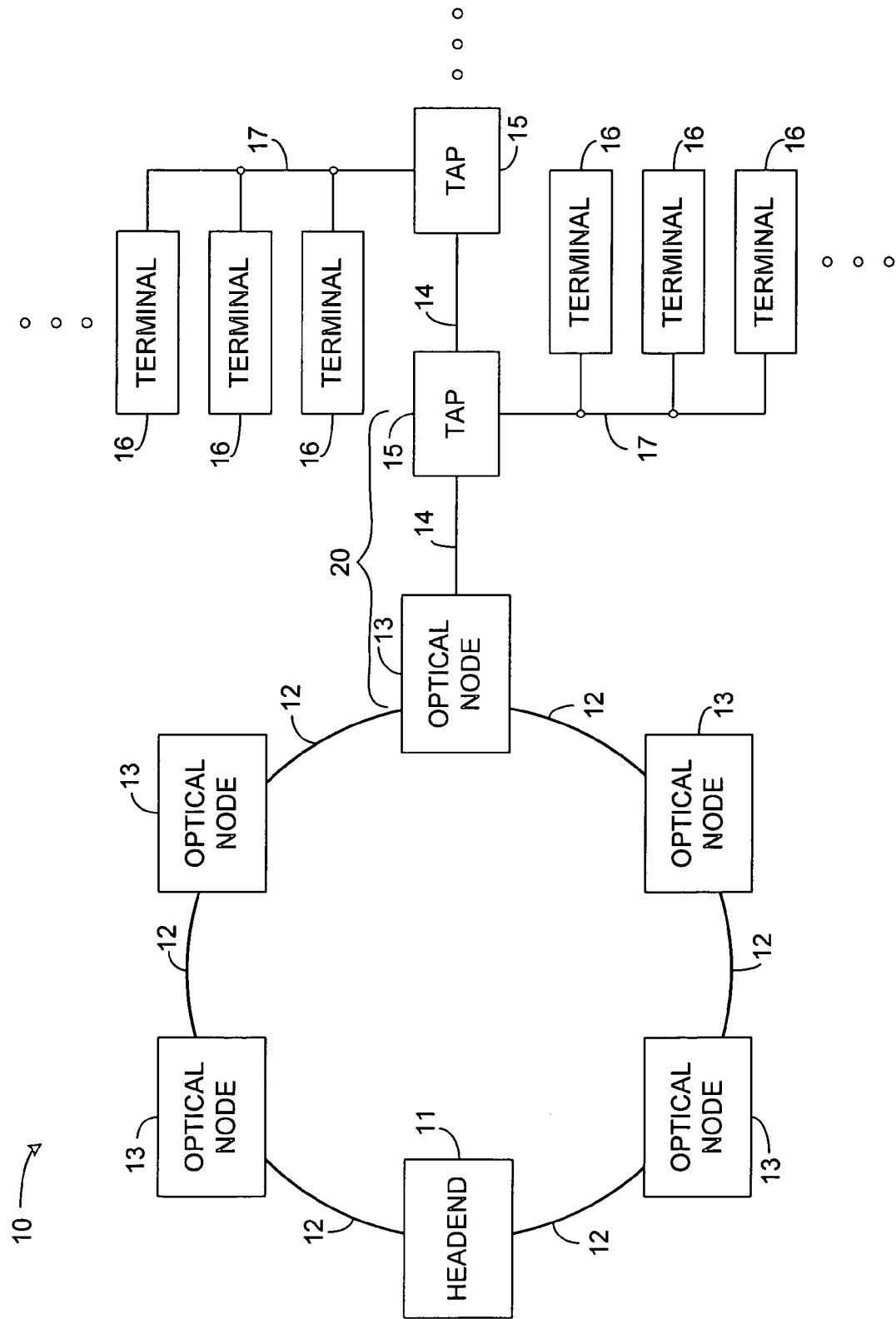
FIG. 1 is a block diagram of a cable television system in accordance with one preferred embodiment of the present invention.

FIG. 1 is a block diagram of a cable television system 10 including a headend 11 for receiving television signals, such as satellite television signals, and converting the signals into a format for transmitting the signals over the system 10. The transmitted signals can, for example, be radio frequency (RF) signals or optical signals, as shown, transmitted over fiber optic cable 12. When the optical signals are transmitted by the headend 11, one or more optical nodes 13 are included in the system 10 for converting the optical signals to RF signals that are thereafter routed over other media, such as coaxial cables 14. Taps 15 are provided within the cable system 10 for splitting the RF signal off, via cables 17, to subscriber equipment such as DHCTs 16, cable-ready television sets, video recorders, or computers. Thus, headend 11 is connected through a network 20 to multiple DHCTs 16.

Figure 2:
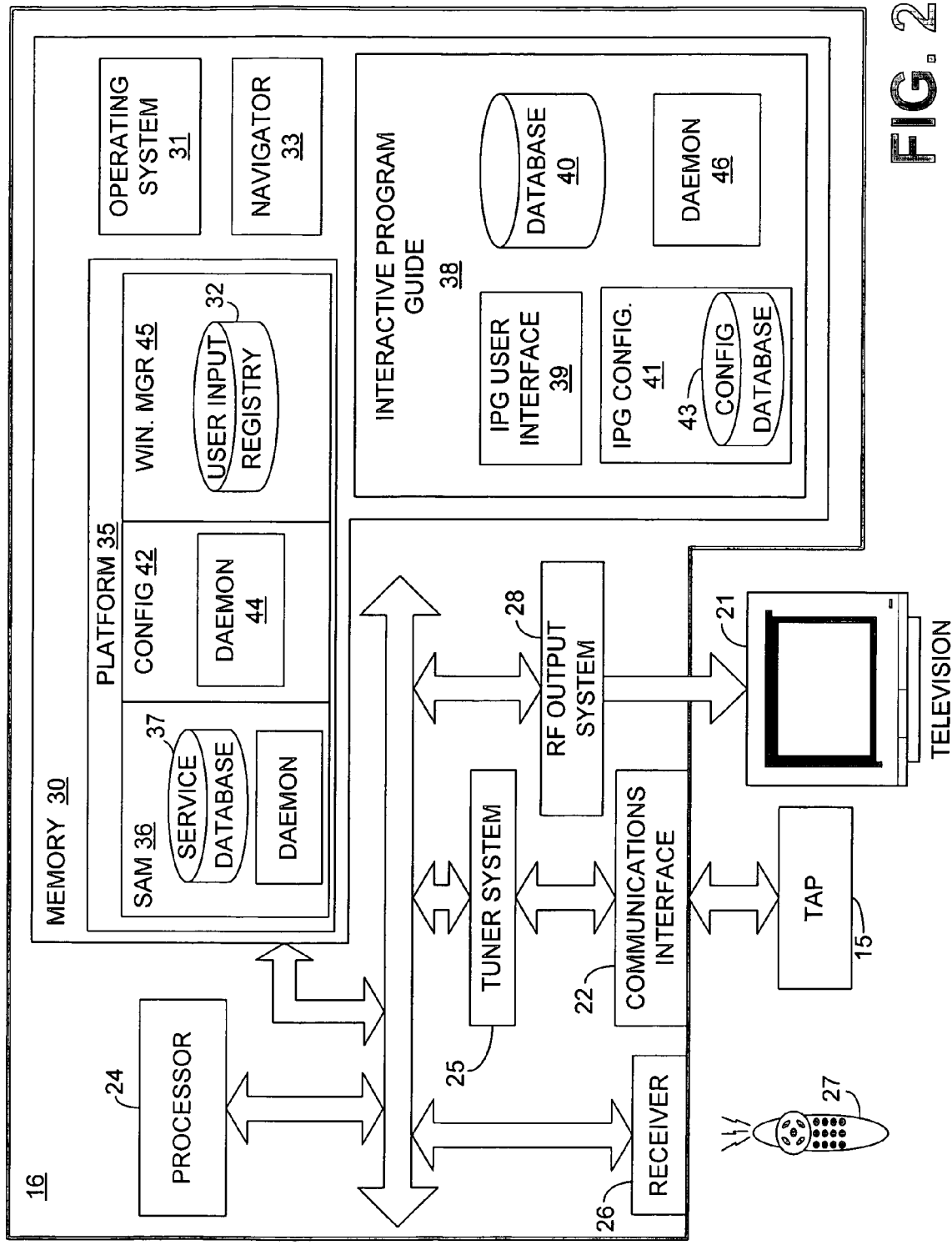
FIG. 2 is a block diagram of a DHCT and related equipment, in accordance with one preferred embodiment of the present invention depicted in FIG. 1.
Figure 10:
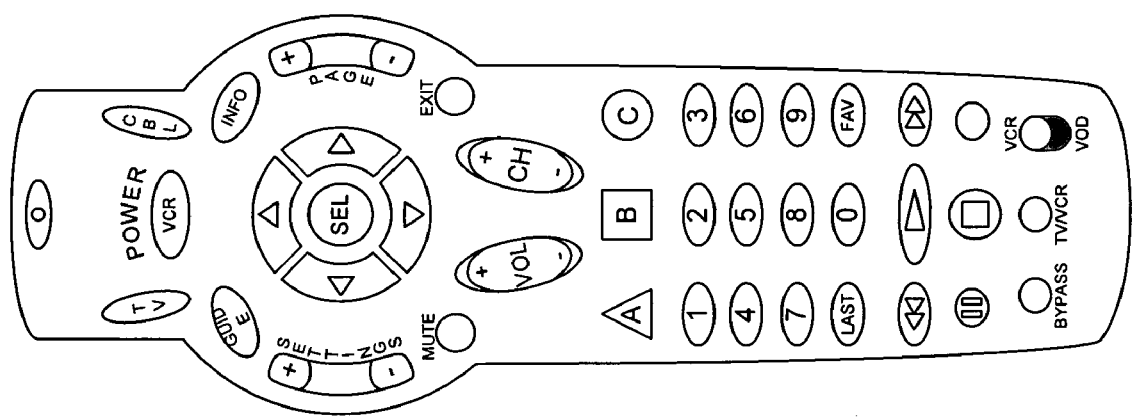
FIG. 10 is a block diagram of an example of a remote control device for use with the DHCT depicted in FIG. 2.

FIG. 2 is a block diagram illustrating the DHCT 16 and other system equipment. The DHCT 16 is typically situated within the residence or business of a subscriber. It may be integrated into a device that has a display 21, such as a television set, or it may be a stand-alone unit that couples to an external display 21, such as a display included in a computer or a television, and that processes television signals for presentation to a subscriber. The terminal 16 preferably comprises a communications interface 22 for receiving the RF signals, which can include video, audio and data information, from the tap 15 and for providing any reverse information to the tap 15 for transmission back to the headend 11 (FIG. 1). The DHCT 16 further includes a processor 24 for controlling operations of the DHCT 16, a video output port such as an RF output system 28 for driving the display 21, and a tuner system 25 for tuning into a particular television channel to be displayed and for sending and receiving various types of data from the headend 11. The tuner system includes in one implementation, an out-of-band tuner for bi-directional quadrature phase shift keying (QPSK) data communication and a quadrature amplitude modulation (QAM) tuner for receiving television signals. Additionally, DHCT 16 includes a receiver 26 for receiving externally-generated information, such as subscriber inputs or commands from other devices. The DHCT 16 may also include one or more wireless or wired communication interfaces, also called ports, for receiving and/or transmitting data to other devices. For instance, the DHCT may feature USB (Universal Serial Bus), Ethernet (for connection to a computer), IEEE-1394 (for connection to media devices in an entertainment center), and serial, and/or parallel ports. The subscriber inputs may, for example, be provided by a computer or transmitter with buttons or keys located on the exterior of the terminal, by a hand-held remote control device 27 (an example of which is shown in FIG. 10), or by a keyboard that includes subscriber-actuated buttons. With brief reference to FIG. 10, among other keys, examples of keys on the remote control device 27 include, without limitation, numeric channel indication keys, or buttons, e.g., keys labeled "0"-"9", non-numeric channel indication keys (channel increment (CH+), channel decrement (CH−), favorite channel (FAV), last channel (LAST)), and directional keys with arrows (UP, DOWN, LEFT, RIGHT), a SELECT (SEL) key, and a GUIDE key.

Memory 30, such as a non-volatile and dynamic random access memory, is coupled to the processor 24 and stores operational parameters, such as commands that are recognized by the processor 24. The most basic functionality of the DHCT 16 is provided by an operating system 31 that operates in memory 30. One or more programmed software applications, herein referred to as applications, are executed by utilizing the computing resources in the DHCT 16. The executable application program stored in memory 30 is executed by processor 24 (e.g., a central processing unit or digital signal processor) under the auspices of the operating system 31. Data required as input by the application program is stored in memory 30 and read by processor 24 from memory 30 as need be during the course of application program execution. Input data may be data stored in memory 30 by a secondary application or other source, either internal or external to the DHCT 16, or may have been created with the application program at the time it was generated as a software application program. Data may be received via any of the communication ports of the DHCT 16, from the headend 11 via the DHCT's network interface (i.e., the QAM or out-of-band tuners) or as subscriber input via receiver 26. A type of input data fulfills and serves the purpose of parameters as described below. Data generated by application program is stored in memory 30 by processor 24 during the course of application program execution. Availability, location and amount of data generated by a first application for consumption by a secondary application is communicated by messages as described below. Messages are communicated through the services of the operating system 31, such as interrupt or polling mechanisms or through data sharing mechanisms such as semaphores.

A Navigator (application) 33 is responsible for providing the subscriber the capability to select services and also provides a core functionality of the DHCT 16, including volume and settings. To implement its functionality, the Navigator 33 communicates with a platform 35, which is a collection of functionality such as the services application manager (SAM)

36, a Configuration Manager 42, and a Window Manager 45 that is useful to the applications. The platform 35 may also include such functionality as a Timer Manager, a Compression Manager, an HTML Parser, a Database Manager, A Widget Toolkit, and other utilities (not shown).

In one implementation, the Window Manager 45 maintains, among other things, a user input registry 32 so that when a subscriber enters a key or a command via the remote device 27 or another input device such as a keyboard or mouse, the user input registry 32 is accessed to determine which of various applications running on the DHCT 16 should receive the inputted key and in what order. The Navigator 33 registers for certain user input commands with the Window Manager 45 so that when the subscriber hits a key corresponding to one of the commands on the remote 27, the command is received by the receiver 26 and relayed to the processor 24. The processor 24 dispatches the event to the operating system 31 where it is forwarded to the Window Manager 45, which ultimately accesses the user input registry 32 and routes the incoming command to the Navigator 33. The Navigator 33 registers for user input commands that correspond to service navigation functions such as selecting a channel (channel increment, channel decrement, favorite, last) and those for other reserved functionality such as a key to activate the program guide, e.g., a GUIDE key.

After the Navigator 33 is activated by the remote 27, it sends a command to a services application manager ("SAM") component 36 part of the platform 35. The SAM 36 maintains a services database 37 of all services available on the DHCT 16 that the subscriber may access. A service is a pairing of an application and a parameter, such as a WatchTV application (not shown) and the television program to tune (e.g. NBC), or an Email application (not shown) and the IP address of the Email server. When the SAM 36 receives a query from the Navigator 33, it accesses the service database 37 and informs the Navigator 33 about the existence and status of the requested service. The Navigator 33 can further query the SAM 36 to determine if the service is authorized for the DHCT 16 and, if so, subsequently command the SAM to activate the service. In response, the SAM 36 initiates an activate service message to the application identified in the service database as the provider of the desired service. As a non-limiting example, the subscriber pressing a "GUIDE" key on the remote 27 would activate the interactive program guide (application) 38. That is, the subscriber presses a first key that invokes display of an interactive program guide (IPG) 38 presentation session.

The IPG 38 displays a program guide to the subscriber and populates the guide with program data for selection. Contained in the IPG 38 is a user interface component 39 that controls the screen display presented to the subscriber on display 21. When the user interface 39 receives the activation message from the SAM 36, the user interface 39 proceeds in accessing an IPG database 40 and a configuration module 41 to determine the appropriate program guide configuration (initial guide arrangement or view) to present to the subscriber on the display 21. The IPG database 40 contains program data files of current and future television programs. An IPG configuration module 41 stores settings that the user interface 39 will implement in creating the display for the subscriber. According to the preferred embodiment of the present invention, the IPG configuration module 41 includes a configuration database 43 of all configurations relevant to the IPG 38. The configuration library 42 allows applications to access configurations stored in other applications, such as the IPG configuration database 43. Some of these configurations are pre-loaded into DHCT 16 non-volatile memory before it is released to a subscriber for use in viewing television services. Additionally, configurations can be updated, added, or replaced in the DHCT 16 by communicating the configuration data files 54 (FIG. 3) from the headend 11 to Configuration Daemon 44 which writes the configuration data files 54 to the various application configuration databases, such as the IPG configuration database 43. Although the IPG configuration database 43 provides a variety of initial configurations that the IPG user interface 39 may implement, one of these is denoted as the selected configuration that is ultimately implemented by the user interface 39. The configuration daemon 44 on the platform 35 will update the application configuration databases, such as IPG configuration database 43, whenever the DHCT 16 is powered up or when the configuration daemon 44 receives an update message from the headend 11 with new settings for the configurations.

When the IPG user interface 39 receives the activate service command from the SAM 36 responsive to a user selecting the IPG from the remote 27, the IPG user interface 39 accesses the IPG configuration module 41 to determine which viewing arrangement to present to the subscriber on the display 21. Based on the configuration information stored in the configuration module 41, the user interface 39 utilizes the window manager 45 and other graphics utilities provided by the operating system 31 to draw the screen on the display 21. The window manager 45 is a component that in one embodiment is part of the platform 35, but in other embodiments may be part of the operating system 31. In addition to the user input registry mentioned previously, it contains functionality for managing screen real-estate and synchronizing the drawing done by multiple applications. The operating system 31 provides primitives to the user interface 39 to, for example, to create a rectangular region on display 21 and to draw into that rectangle graphics utilities such as lines, shadings and strings.

As a window is created on display 21 for presentation to the subscriber, the IPG user-interface 39 registers with the window manager 45 for particular user input commands that are required by the newly-created window on the display 21. The IPG 38 also contains a daemon 46 that receives program data files 53 from the headend 11, and the daemon 46 stores the program data files 53 in the database 40 for utilization by the user interface 39.

The Navigator application 33, IPG 38, and all other applications executed by the resources of the DHCT 16 comprise an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example, but is not limited to, an electronic, solid-state, magnetic, optical, electromagnetic, infrared, or semiconductor system, apparatus, device, or propagation medium, either internal to the DHCT 16 or externally connected to the DHCT 16 via one or more communication ports or network interfaces. More specific examples (a nonexhaustive list) of the computer-readable medium would include the following: an electrical connection (electronic) having one or more wires, a portable computer diskette (magnetic), a hard drive storage device (magnetic) a random access memory (RAM) (solid-state device), a read-only memory (ROM) (solid-state device), an erasable programmable read-only memory (EPROM or Flash memory) (multiple devices), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. Furthermore, any process descriptions or blocks in flow charts should be understood as representing modules, segments, or portions of code or programmed software which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figure 3:
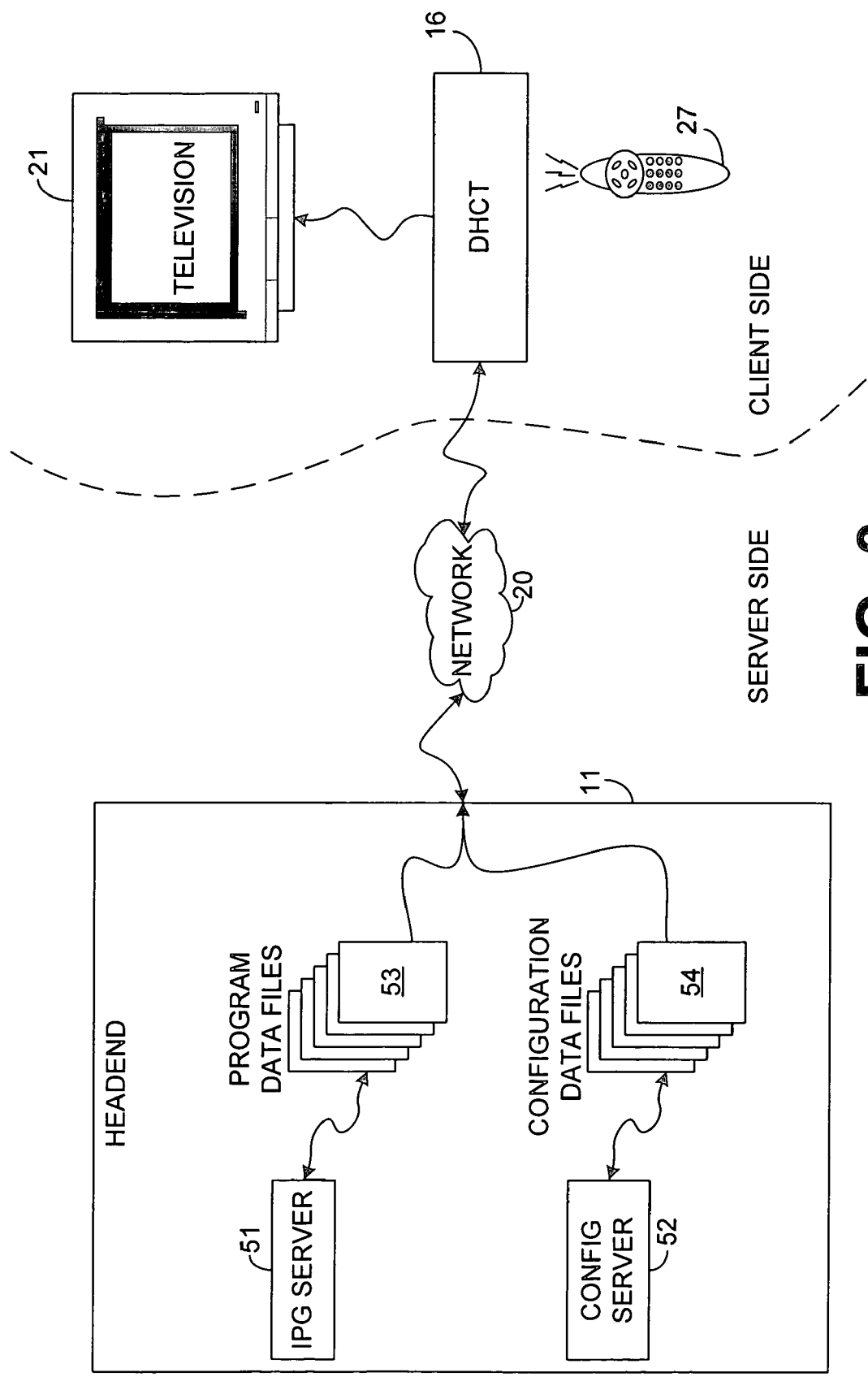
FIG. 3 is a diagram depicting files that are transferred from the headend of the cable television system across to the DHCT depicted in FIG. 2.

FIG. 3 is a diagram of selected components resident on the headend 11 and their interaction with the DHCT 16 on the client side of the network 20. An IPG server 51 is contained on the headend 11 and assembles program data files 53 for transmission across the network 20 to the IPG daemon 46 (FIG. 2) in the DHCT 16. The program data files 53 are the data files that contain information about current and of future programs, including their prospective viewing times, descriptive information, channels etc. The IPG server 51 allows the system operator to configure how many days in advance for which the program data files 53 will contain programming information. A configuration server 52 maintains and transmits across network 20 configuration data files 54 that comprise a plurality of program guide arrangement definitions, as well as indication of a selected initial program guide arrangement for the display 21.

With reference to FIG. 2, the configuration daemon 44 receives the configuration information and stores it in the IPG configuration database 43 from which configuration module 41 accesses the information, as discussed above. The program data files 53 (FIG. 3) created by the IPG server 51 on the headend 11 are received by the IPG Daemon 46 which populates the IPG database 40 in memory 30 with the program data files 53 for utilization by the user interface 39 when commanded by the subscriber. Alternatively, the IPG database 40, or parts thereof may be stored in a storage device that is internal to the DHCT 16 or externally connected to the DHCT 16 via a communication port such as USB or IEEE-1394.

In FIG. 2 and FIG. 3, functionality of the various layers of software, including the operating system 31, platform 35, and applications such as the IPG 38 and Navigator 33 are generally present on both the client side and the server side of the cable television system. The Navigator 33 assists in providing basic cable services and navigation framework to the subscriber. The services available can include watching television and pay-per-view events, listening to digital music, and viewing the interactive program guide 38 (FIG. 2). The Navigator 33 also allows subscribers to access the settings in the DHCT 16 (FIG. 2), including volume, parental control, VCR commands, etc. The operating system 31 is a resident operating system on the DHCT 16 and is provisioned for reception of multi-media data over the broadcast and interactive cable networks and uses an open and modular platform to allow flexibility and customization. As a result, some features of the operating system 31 include real time multi-media data reception, streaming and processing, as well as multi-tasking capability, and an open platform. The operating system 31 also provisions the communication of data among different entities such as a multiplicity of applications executing in the DHCT 16. The application interface system (AIS) or Platform 35 is a collection of end-to-end software interfaces enabling applications on the cable televisions system network 10. The SAM 36 provides an interface and mechanism through which applications can be developed, introduced on the network, defined as a service, downloaded to the DHCT 16, executed on the DHCT 16 and removed from the network. The AIS is an end layer of application and service management software components that an application must utilize to exist in the cable television system network 10. It also consists of resource access and management components generally required by applications in the cable television system network 10. None of the AIS components have any client-side subscriber-interfaces, although graphical subscriber interfaces can exist to access server-side components.

FIG. 4 is a diagram of a control menu 64 for a system operator at the headend 11 to configure how a reduced screen display area of the IPG user interface 39 will be controlled, in accordance with the present invention as depicted in FIG. 2. In one implementation, a system operator can use the menu to select the desired settings for the reduced screen display area. These settings will determine how the reduced screen display area will be tuned in relation to the television program information that will be presented to a subscriber and in relation to input received by the DHCT 16 (FIG. 2) from a subscriber. These selections are communicated across the system network 20 to each individual DHCT 16. The settings and factors that determine which channel a reduced screen display area is tuned to are discussed in more detail below. Of course, many other arrangements and expressions of the options shown in FIG. 4 are considered to be within the scope of the present invention. In addition, an alternative embodiment of the present invention permits the subscriber to determine how the reduced screen display area will be tuned in relation to the television program information that is to be presented to a subscriber and in relation to subsequent subscriber input.

Regarding the implementation shown in FIG. 4, as discussed in more detail below, settings are first included for determining whether and how "in-focus" (highlighted) or "selected" (responsive to a SELECT key being pressed) program titles in the interactive program guide affect the reduced screen. A user typically moves a highlighted cursor around the interactive program guide using the arrow keys (UP, DOWN, RIGHT, LEFT) on the remote control 27, thus changing the "in-focus" program. In addition, the interactive program guide can be configured to use numeric and/or non-numeric channel keys to exit the interactive program guide and turn to the requested channel, tune the reduced screen to the requested channel, or make the requested channel the "in-focus" channel within the interactive program guide (which would then cause such keys to defer to the setting of the above selection regarding the effect of the "in-focus" indication.

Figure 5:
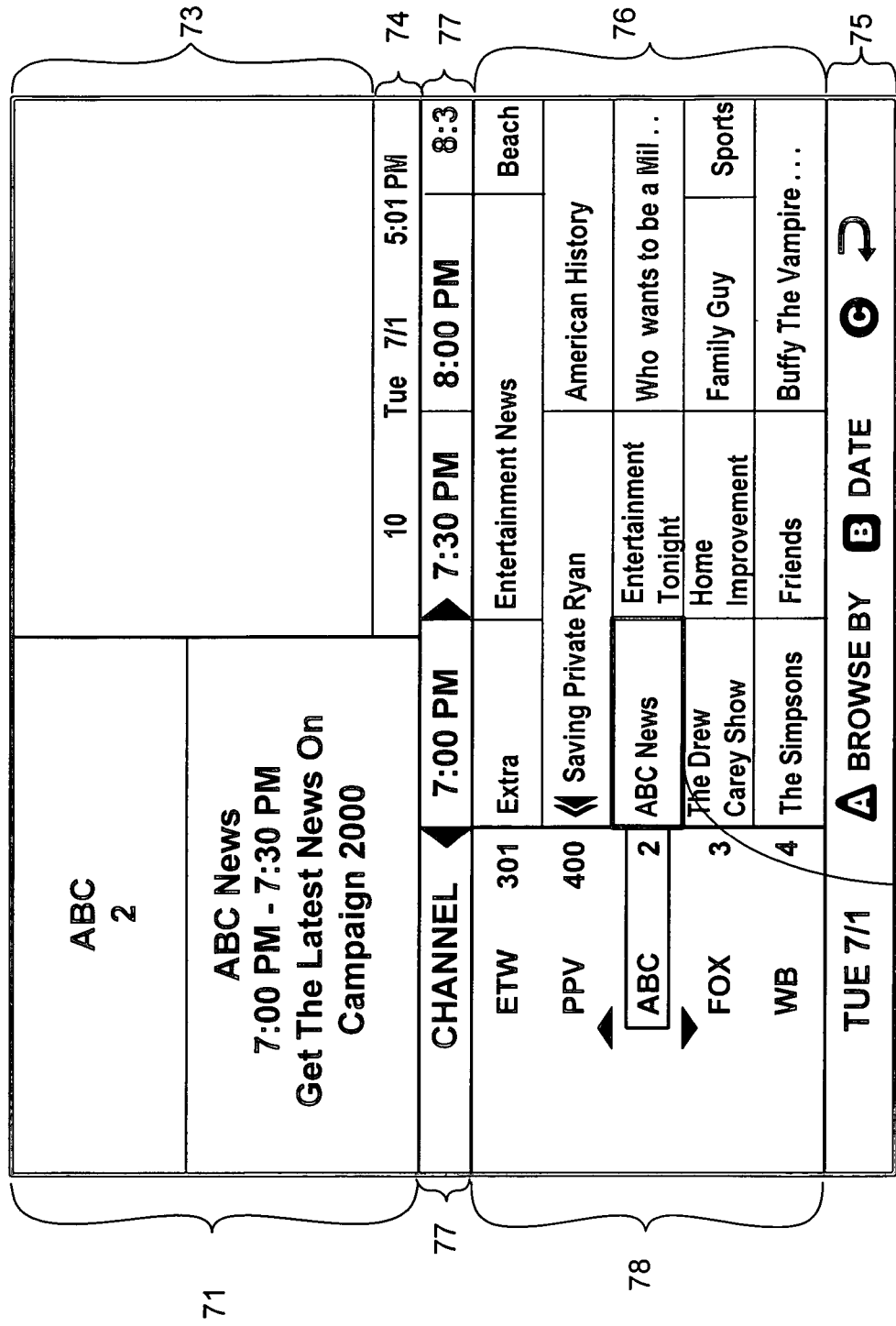
FIG. 5 is an example screen diagram that illustrates an initial guide arrangement in a time format that the DHCT as depicted in FIG. 2 presents to the subscriber.

FIG. 5 is an example screen diagram of the IPG display 70 that illustrates an initial guide arrangement in a time format that the DHCT 16 as depicted in FIG. 2 presents the user. The top left portion of the main IPG display 70 is a detailed focus area 71 that includes detailed channel information (channel number, channel name (ABC), program name, program description, duration, any episode information or rating, etc.) for an "in-focus" program corresponding to highlighted program area 72 in a main program display area 76. Video showing on the channel to which the DHCT 16 is currently tuned (for which audio is also playing, and which is typically the program occupying the full screen before the IPG 38 is activated) is displayed in a roughly one-quarter screen reduced screen display area 73 in the IPG display 70. Immediately below the reduced screen display area 73 is an information banner 74 depicting the channel to which the DHCT 16 is currently tuned, the current day and date, and the current time. The middle left portion of the IPG display 70 includes a channel area 78 that is related to the selected ordering format and is described in more detail below. The middle portion of the IPG display 70 includes a heading area 77 that contains headings related to the information displayed in the channel area 78 and the main program display area 76. The main program display area 76 contains television program titles corresponding to television programs that are or will be available for viewing during the time periods listed the heading area 77. The highlighted program area 72 is centered in the main program display area 76 enabling the subscriber to scroll up and down to the various program titles listed in the main program display area 76.

The main program display area 76 includes program names, or titles, organized in a grid of rows of channels and columns of time. The channel area 78 includes a vertical list of channels organized sequentially from top to bottom by increasing channel number. The main program display area 76 can be scrolled with the arrow keys on the remote control 27 in both time and channel number dimensions. The time dimensions are a horizontal array of program names categorized in columns of times in which they are broadcast. As the subscriber scrolls in time across a calendar day boundary, the selected day displayed in various areas is automatically updated.

When the IPG 38 (FIG. 2) is first activated by the subscriber and the time view is configured to be the initial view, the first, or lowest, channel, including channel name and number, in the channel lineup is centered in the channel area 78 of the IPG display 70. In this non-limiting example, the lowest channel in this channel list displayed in the channel area 78 is ABC, which is shown as channel 2. Continuing with this non-limiting example, the left-most time column in the main program display area 76 is set to include titles of programs scheduled to be broadcast about two hours into the future with the middle title being "in-focus" and corresponding to a program on the lowest available channel. Therefore, in this example, the program ABC news which is on channel 2, is centered in the highlighted program area 72. It should be noted that the current program shown in reduced screen display area 73 and referenced in information banner 74, corresponds to channel 10 and not to the in-focus program on channel 2. The bottom area 75 of IPG display 70 indicates the selected day for which program data is being displayed as well as the options for the "A", "B", and "C" keys on the remote 27 (FIG. 2). The "A" key is assigned to invoke a "Browse-by" menu which would enable subscribers to select alternative program guide arrangement views such as, for example, program guides containing television program information arranged on the basis of title or theme. The "B" key enables the subscriber to select an alternative date for which television program information is presented. Operation of the "C" key results in the program currently showing on the channel to which the DHCT is tuned becoming the "in-focus" program; thus, the displaying of television program titles in the main program display area 76 which correspond to television programs that are or will be playing during an aggregate time period that includes the current time. The time periods listed in the heading area 77 are updated accordingly so that the time period listed above the left most column of the main display area 76 includes the current time.

Figure 6:
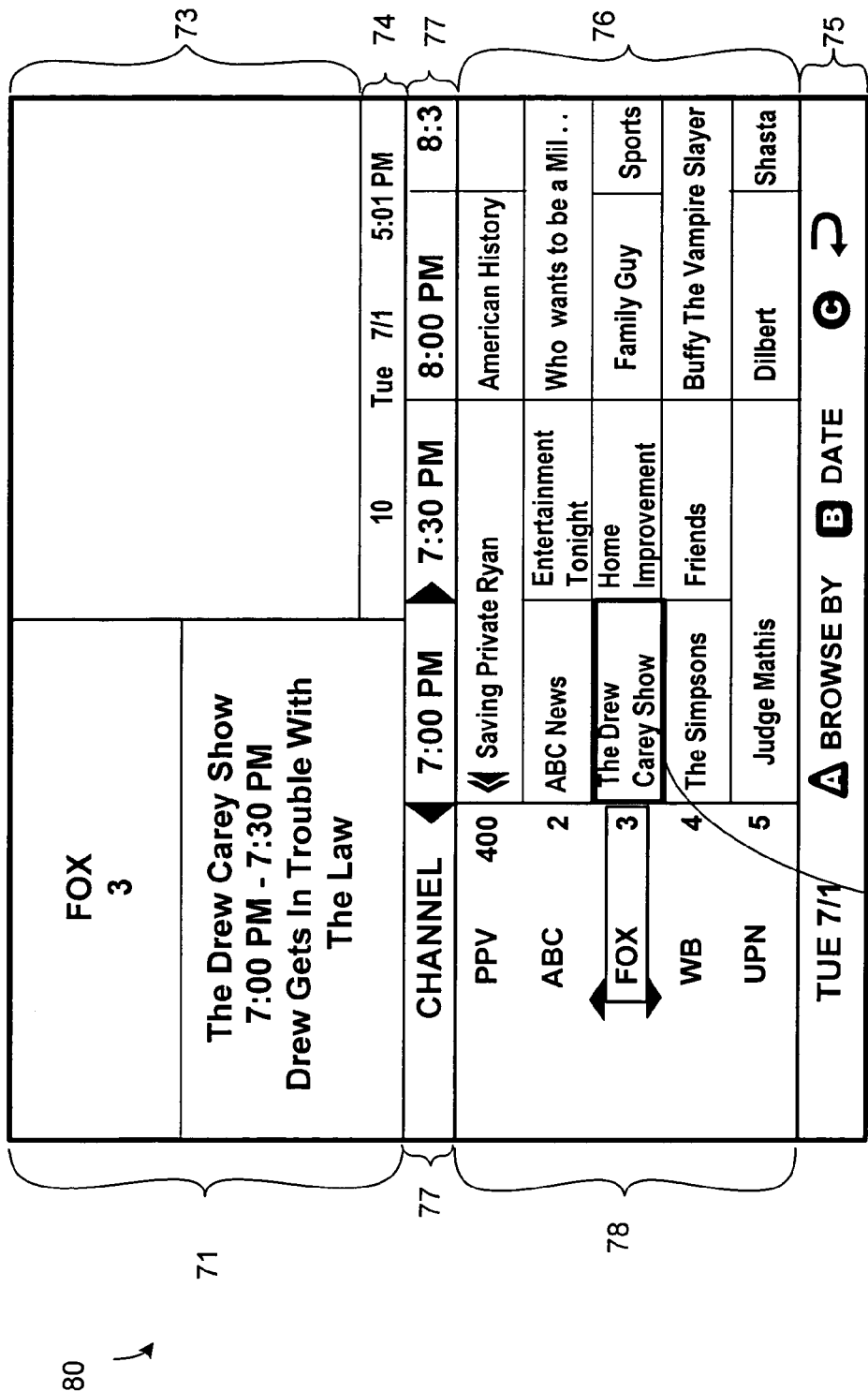
FIG. 6 is an example screen diagram that illustrates how the tuning of the reduced screen display area does not follow the in-focus television program as the screen transitions from that shown in FIG. 5.

FIG. 6 is an example screen diagram of the IPG display 80 that illustrates how the tuning of the reduced screen display area 73 operates when the "REDUCED SCREEN TUNING UNRELATED TO IN-FOCUS CHANNEL" option in FIG. 4 is selected by a system operator at the headend. Under this scenario, by pressing a down arrow on the remote 27 (FIG. 2), a subscriber can cause the DHCT 16 to scroll through the IPG display 70 (FIG. 5) so that, in effect, the IPG display 80 as shown in FIG. 6 is displayed. Therefore, in this example, the program The Drew Carey Show, which is on channel 3, is centered in the highlighted program area 72. Notice that the channel number in information banner 74 still indicates channel number 10. This indicates that the reduced screen display area 73 is still tuned to channel 10 and that merely scrolling through the channel area 78 by the subscriber did not affect the tuning of the reduced screen display area 73. A similar result would occur if the "SELECTED IN-FOCUS CHANNEL DETERMINES REDUCED SCREEN" option were instead selected by the system operator. However, the results would change to those shown in FIG. 7 if the user then pressed the SELECT key on the remote 27 (FIG. 2). According to the shown embodiment, the current program is not the same as the "in-focus" program since they are approximately two hours apart. In other embodiments, an additional notice or menu will appear notifying and requesting confirmation that the user wishes to tune the reduced display area 73 to the current program on the selected channel.

Figure 7:
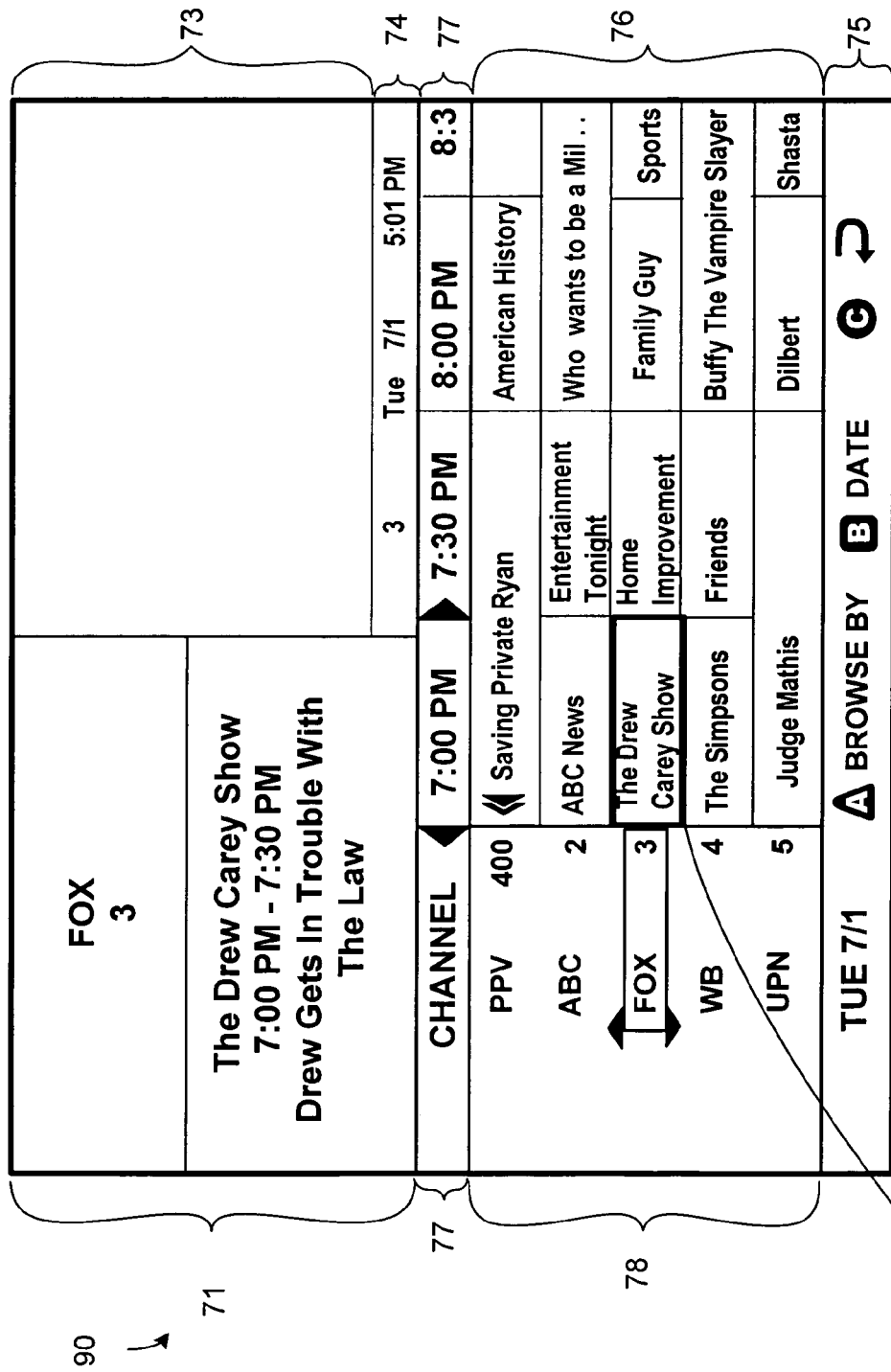
FIG. 7 is an example screen diagram that illustrates the tuning of a reduced screen display area to the channel of the in-focus television program in FIG. 6.

FIG. 7 is also an example of the IPG display 90 that illustrates how the tuning of the reduced screen display area 73 operates while the "IN-FOCUS CHANNEL DETERMINES REDUCED SCREEN" option as illustrated in FIG. 4 is the active selection. Under this scenario, moving between FIG. 5 and FIG. 7 with the use of a down arrow on remote 27 (FIG. 2), the reduced screen display area 73 is tuned to channel 3 as indicated in the information banner 74 after the subscriber scrolls down to channel 3 in the channel area 78. It should be noted that if a subscriber scrolls quickly through the channels in the channel area 78, the reduced screen display portion 73 will not tune to the channel corresponding to the television program in the highlighted area 72 until after the subscriber has stopped scrolling for a predetermined amount of time, e.g., half a second.

Figure 8:
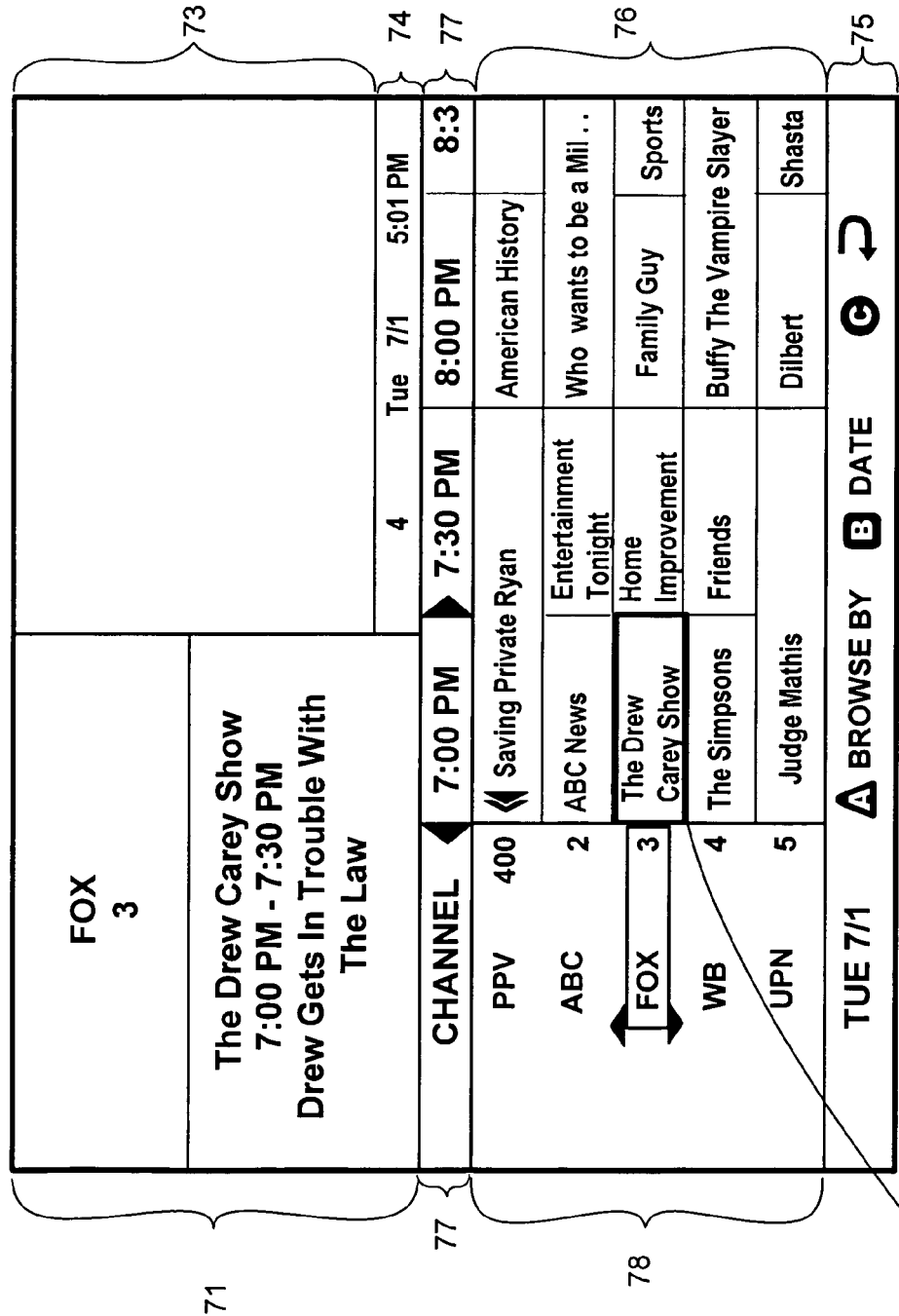
FIG. 8 is an example screen diagram that illustrates the tuning of a reduced screen display area to the next higher numbered channel than the channel of the in-focus program in FIG. 7.

FIG. 8 is an example of the IPG display 100 that illustrates how the tuning of the reduced screen display area 73 operates while the "NON-NUMERIC CHANNEL SIGNALS: TUNE REDUCED SCREEN TO REQUESTED CHANNEL" option in FIG. 4 is active, as transitioned from FIG. 7. Under this example scenario, after a subscriber uses the remote 27 (FIG. 2) to send the non-numeric channel key signal for "channel up," such as a CH+ key on the remote, to the DHCT 16 as depicted in FIG. 2, the reduced screen display area 73 is tuned to channel 4 to display the current program on that channel as indicated in the information banner 74. If a subscriber were to send a "channel down" signal instead of a "channel up" signal, then the reduced screen display area would be tuned to channel 2 instead of channel 4. Likewise, the LAST and FAV keys would cause the last and favorite channels, as tracked by the navigator application 33 in the DHCT 16 (FIG. 2), to be tuned to display the current program on that channel in the reduced screen display area 73. Of course, if the "NON-NUMERIC CHANNEL SIGNALS: EXIT IPG AND TUNE TO REQUESTED CHANNEL" option in FIG. 4 is active, pushing the "channel up" key, for example, on the remote 27 (FIG. 2) would cause the IPG display 90 to disappear, and channel 4 would be tuned in full screen. Other non-numeric channel keys would likewise prompt similar results. However, if the "NON-NUMERIC CHANNEL SIGNALS: CHANGE IN-FOCUS CHANNEL TO REQUESTED CHANNEL" option in FIG. 4 is active, operation of any of the non-numeric channel keys would cause the current program on that requested channel to become the "in-focus" program, which may or may not affect the reduced screen display area 73 depending on the setting of the "IN-FOCUS CHANNEL DETERMINES REDUCED SCREEN" option, as discussed above.

Figure 9:
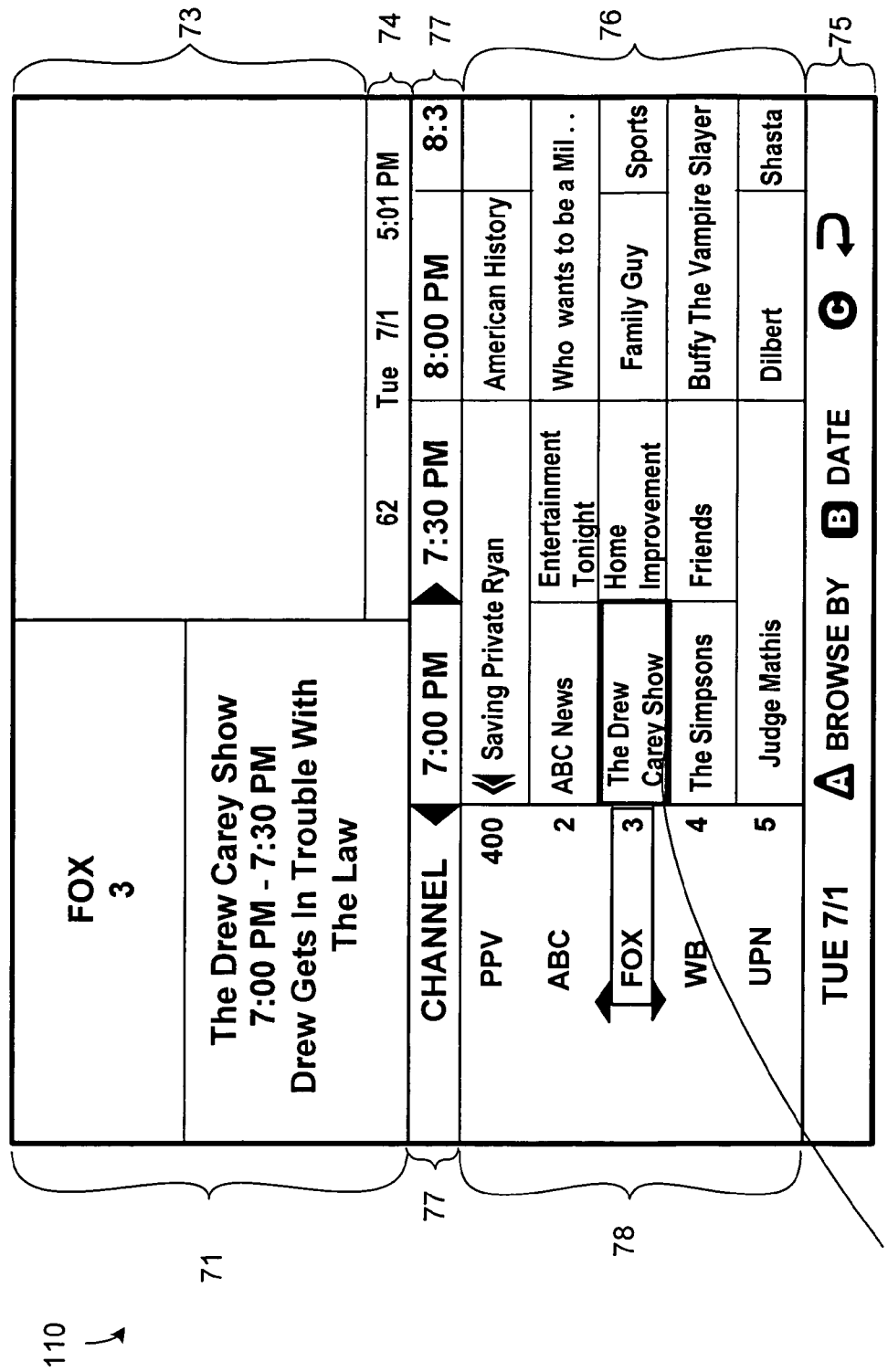
FIG. 9 is an example screen diagram that illustrates the tuning of a reduced screen display area to a channel number specified through user input received by the DHCT as depicted in FIG. 2.

FIG. 9 is an example of the IPG display 110 that illustrates how the tuning of the reduced screen display area 73 operates while the "NUMERIC CHANNEL SIGNALS: TUNE REDUCED SCREEN TO REQUESTED CHANNEL" option in FIG. 4 is active, as transitioned from FIG. 7. Under this scenario, after the subscriber uses the numeric "6" and "2" keys on the remote 27 (FIG. 2) to select channel 62, the reduced screen display area 73 is tuned to channel 62 as indicated in the information banner 74. Likewise, if the "NUMERIC CHANNEL SIGNALS: EXIT IPG AND TUNE TO REQUESTED CHANNEL" option in FIG. 4 is active, entering any channel numbers will cause the IPG display 90 to be removed from the screen, leaving the full screen tuned to the entered channel number. Furthermore, if the "NUMERIC CHANNEL SIGNALS: CHANGE IN-FOCUS CHANNEL TO REQUESTED CHANNEL" option is active, the program currently on that requested channel will become the "in-focus" channel, with the "IN-FOCUS CHANNEL DETERMINES REDUCED SCREEN" option determining whether such change in focus affects the reduced screen area 73.

An alternate embodiment of the invention provides a menu display accessed via the remote to allow the user to swap the position of the reduced screen area 73 and "in-focus" program information area 71 such that 71 is on the right and 73 on the left.

Additionally, an alternate embodiment of the invention includes the navigator application 33 applying the configurations for FIG. 4 "NON-NUMERIC CHANNEL SIGNALS" and "NUMERIC CHANNEL SIGNALS" to other applications that display on a portion of the screen with a reduced screen area showing the DHCT 16 channel as in reduced screen area 73. In a non-limiting example, an email application may be activated via the SAM and the current channel displayed reduced in the upper right ¼ screen. If the "NON-NUMERIC CHANNEL SIGNALS: TUNE REDUCED SCREEN TO REQUESTED CHANNEL" is selected by the system operator, subsequent user remote input for non-numeric channel keys such as CH+, CH−, LAST, FAV will change the channel in the reduced screen as directed via the remote command. Or, if "NON-NUMERIC CHANNEL SIGNALS: EXIT IPG AND TUNE TO REQUESTED CHANNEL" is selected by the system operator, subsequent user remote input for non-numeric channel keys such as CH+, CH−, LAST, FAV will exit the application and change the channel in the reduced screen as directed via the remote command. Similarly, the numeric channel signals configuration is interpreted by the navigator 33 as well.

It should be emphasized that the above-described embodiments of the present invention, particularly, any "preferred embodiments" are merely possible examples of the implementations, merely set forth for a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

We claim:

1. A method for providing video content via a television, comprising the steps of:
    providing a user with a menu that includes a plurality of options corresponding to respective control settings for controlling functionality of a channel navigation key, wherein the menu is displayed via the television;
    receiving a first user input corresponding to one of the plurality of options that is configured to a first conditional terminate provision of an interactive program guide (IPG) having a plurality of television program listings;
    providing the IPG;
    receiving a second conditional user input corresponding to the channel navigation key; and
    responsive to receiving the second conditional user input and responsive to having previously received the first conditional user input:
    terminating providing of the IPG; and
    providing a video presentation.

2. The method of claim 1, wherein a video display area is provided in conjunction with the IPG, and wherein the video presentation that is provided responsive to receiving the second conditional user input is different from a video presentation that is displayed in the video display area immediately prior to receiving the second conditional user input.

3. A method for providing video content via a television, comprising the steps of:
    providing a user with a menu that includes a plurality of options corresponding to respective control settings for controlling functionality of numeral input keys, wherein the menu is displayed via the television;
    receiving a first user input corresponding to one of the plurality of options that is configured to a first conditional terminate provision of an interactive program guide (IPG) having a plurality of television program listings;
    providing the IPG;
    receiving a second conditional user input corresponding to at least one of the numeral input keys; and
    responsive to receiving the second conditional user input and responsive to having previously received the first conditional user input:
    terminating provision of the IPG; and
    providing a video presentation.

4. The method of claim 3, wherein a video display area is provided in conjunction with the IPG, and wherein the video presentation that is provided responsive to receiving the second conditional user input is different from a video presentation that is displayed in the video display area immediately prior to receiving the second conditional user input.

5. A television set-top terminal (STT) configured to output video signals to a television, the STT comprising:
    at least one tuner configured to receive video signals corresponding to video presentations;
    memory having stored therein program code; and
    at least one processor that is programmed by the program code to enable the STT to:
    provide a user with a menu that includes a plurality of options corresponding to respective control settings for controlling functionality of a channel navigation key, wherein the menu is displayed via the television;
    receive a first user input corresponding to one of the plurality of options that is configured to a first conditional terminate provision of an interactive program guide (IPG) having a plurality of television program listings;

provide the IPG;

receive a second conditional user input corresponding to the channel navigation key; and responsive to receiving the second conditional user input and responsive to having previously received the first conditional user input:

terminate provision of the IPG; and provide a video presentation.

6. The television STT of claim 5, wherein a video display area is provided in conjunction with the IPG, and wherein the video presentation that is provided responsive to receiving the second user input is different from a video presentation that is displayed in the video display area immediately prior to receiving the second user input.

7. A television set-top terminal (STT) configured to output video signals to a television, the STT comprising:

at least one tuner configured to receive video signals corresponding to video presentations;

memory having stored therein program code; and at least one processor that is programmed by the program code to enable the STT to:

provide a user with a menu that includes a plurality of options corresponding to respective control setting for controlling functionality of numeral input keys, wherein the menu is displayed via the television;

receive a first user input corresponding to one of the plurality of options that is configured to a first conditional terminate provision of an interactive program guide (IPG) having a plurality of television program listings;

provide the IPG;

receive a second conditional user input corresponding to at least one of the numeral input keys; and responsive to receiving the second conditional user input and responsive to having previously received the first conditional user input:

terminate provision of the IPG; and provide a video presentation.

8. The television set-top terminal of claim 7, wherein a video display area is provided in conjunction with the IPG, and wherein the video presentation that is provided responsive to receiving the second conditional user input is different from a video presentation that is displayed in the video display area immediately prior to receiving the second user input.

\* \* \* \* \*